United States Patent
Post, II et al.

(10) Patent No.: US 8,229,642 B2
(45) Date of Patent: Jul. 24, 2012

(54) VEHICLE SYSTEMS CONTROL FOR IMPROVING STABILITY

(75) Inventors: James W. Post, II, Dublin, OH (US);
Xiaodi Kang, Dublin, OH (US);
William Monsma, Marysville, OH (US)

(73) Assignee: Honda Motor Co., Ltd., Tokyo (JP)

(*) Notice: Subject to any disclaimer, the term of this patent is extended or adjusted under 35 U.S.C. 154(b) by 1218 days.

(21) Appl. No.: 12/019,341

(22) Filed: Jan. 24, 2008

(65) Prior Publication Data

US 2008/0183353 A1 Jul. 31, 2008

Related U.S. Application Data

(60) Provisional application No. 60/886,536, filed on Jan. 25, 2007.

(51) Int. Cl.
*B60G 21/00* (2006.01)
(52) U.S. Cl. .......... 701/91; 701/37; 701/48; 701/71; 701/82; 280/5.512; 280/5.515; 303/140; 303/146; 303/150
(58) Field of Classification Search .............. 701/37, 701/42, 43, 38, 48, 70–73, 79, 80, 82–84, 701/91; 180/197, 199, 233; 303/138–140, 303/143, 144, 146, 148–150; 280/5.5, 5.506, 280/5.507, 5.511, 5.512, 5.515
See application file for complete search history.

(56) References Cited

U.S. PATENT DOCUMENTS

| | | | |
|---|---|---|---|
| 5,103,397 A | 4/1992 | Ikemoto et al. | |
| 5,123,497 A * | 6/1992 | Yopp et al. | 180/422 |
| 5,178,231 A | 1/1993 | Watanabe et al. | |
| 5,183,127 A | 2/1993 | Kageyama et al. | |
| 5,228,719 A * | 7/1993 | Fukuyama et al. | 280/5.505 |
| 5,384,705 A | 1/1995 | Inagaki et al. | |
| 5,444,621 A * | 8/1995 | Matsunaga et al. | 701/37 |
| 5,490,068 A | 2/1996 | Shimizu et al. | |
| 5,517,414 A | 5/1996 | Hrovat | |

(Continued)

FOREIGN PATENT DOCUMENTS

DE 38 17 540 11/1989

(Continued)

OTHER PUBLICATIONS

European Search Report of European Patent Application No. 08728212.5 dated Aug. 27, 2010.

*Primary Examiner* — Thomas G. Black
*Assistant Examiner* — Ce Li
(74) *Attorney, Agent, or Firm* — Mark E. Duell; Rankin Hill & Clark LLP

(57) ABSTRACT

Improved methods of controlling the stability of a vehicle are provided via the cooperative operation of vehicle stability control systems such as an Active Yaw Control system, Antilock Braking System, and Traction Control System. These methods use recognition of road surface information including the road friction coefficient (mu), wheel slippage, and yaw deviations. The methods then modify the settings of the active damping system and/or the distribution of drive torque, as necessary, to increase/reduce damping in the suspension and shift torque application at the wheels, thus preventing a significant shift of load in the vehicle and/or improving vehicle drivability and comfort. The adjustments of the active damping system or torque distribution temporarily override any characteristics that were pre-selected by the driver.

7 Claims, 17 Drawing Sheets

U.S. PATENT DOCUMENTS

| | | | |
|---|---|---|---|
| 5,692,587 | A | 12/1997 | Fratini, Jr. |
| 5,742,917 | A * | 4/1998 | Matsuno ................. 701/69 |
| 5,852,787 | A | 12/1998 | Fodor et al. |
| 5,983,150 | A | 11/1999 | Sasaki |
| 6,023,649 | A | 2/2000 | Matsuura et al. |
| 6,036,206 | A | 3/2000 | Bastin et al. |
| 6,094,614 | A * | 7/2000 | Hiwatashi ............... 701/89 |
| 6,181,997 | B1 | 1/2001 | Badenoch et al. |
| 6,219,602 | B1 | 4/2001 | Badenoch et al. |
| 6,370,458 | B1 | 4/2002 | Shal et al. |
| 6,481,806 | B1 | 11/2002 | Krueger et al. |
| 6,493,623 | B2 | 12/2002 | Nishida et al. |
| 6,505,108 | B2 | 1/2003 | Bodie et al. |
| 6,516,257 | B2 | 2/2003 | Shal et al. |
| 6,546,324 | B1 | 4/2003 | Chen et al. |
| 6,564,129 | B2 | 5/2003 | Badenoch |
| 6,587,775 | B2 | 7/2003 | Nishida et al. |
| 6,591,178 | B2 | 7/2003 | Krueger et al. |
| 6,658,342 | B1 | 12/2003 | Hac |
| 6,684,140 | B2 | 1/2004 | Lu |
| 6,697,725 | B1 | 2/2004 | Williams |
| 6,721,636 | B1 | 4/2004 | Gade |
| 6,751,537 | B2 | 6/2004 | Koh |
| 6,873,897 | B2 | 3/2005 | Faye et al. |
| 6,892,123 | B2 | 5/2005 | Hac |
| 6,973,381 | B2 | 12/2005 | Kingston |
| 7,007,763 | B2 | 3/2006 | Ginther et al. |
| 7,027,902 | B2 | 4/2006 | Lu et al. |
| 7,162,346 | B2 | 1/2007 | Berry et al. |
| 7,210,688 | B2 | 5/2007 | Kobayashi |
| 7,248,957 | B2 | 7/2007 | Billig |
| 7,290,634 | B2 | 11/2007 | Clare et al. |
| 7,413,063 | B1 * | 8/2008 | Davis .................. 188/267.1 |
| 2001/0032045 | A1 * | 10/2001 | Hano et al. ............. 701/80 |
| 2003/0050742 | A1 * | 3/2003 | Sakamoto et al. ........ 701/1 |
| 2003/0125857 | A1 | 7/2003 | Madau et al. |
| 2003/0187555 | A1 * | 10/2003 | Lutz et al. ............. 701/29 |
| 2003/0200016 | A1 | 10/2003 | Spillane et al. |
| 2003/0204293 | A1 * | 10/2003 | Shiino et al. .......... 701/37 |
| 2004/0015279 | A1 * | 1/2004 | Barron et al. .......... 701/37 |
| 2004/0024562 | A1 * | 2/2004 | Barron et al. ......... 702/142 |
| 2004/0128044 | A1 | 7/2004 | Hac |
| 2004/0176889 | A1 * | 9/2004 | Capito ................... 701/37 |
| 2004/0176898 | A1 | 9/2004 | Belvo et al. |
| 2004/0199313 | A1 | 10/2004 | Dellinger |
| 2005/0085988 | A1 | 4/2005 | Ushiroda et al. |
| 2005/0121248 | A1 | 6/2005 | Ushiroda et al. |
| 2005/0234620 | A1 | 10/2005 | Roll et al. |
| 2005/0235744 | A1 | 10/2005 | Ogawa |
| 2005/0236782 | A1 | 10/2005 | Kobayashi |
| 2006/0052927 | A1 | 3/2006 | Watanabe et al. |
| 2006/0074530 | A1 | 4/2006 | Meyers et al. |
| 2006/0100766 | A1 | 5/2006 | Schwarz et al. |
| 2006/0162981 | A1 | 7/2006 | Kurosawa et al. |
| 2006/0169516 | A1 | 8/2006 | Masuya et al. |
| 2006/0253240 | A1 | 11/2006 | Rao et al. |
| 2006/0273657 | A1 | 12/2006 | Wanke et al. |
| 2006/0278460 | A1 | 12/2006 | Matsuno et al. |
| 2007/0016354 | A1 * | 1/2007 | Engel et al. ............. 701/80 |
| 2007/0095593 | A1 | 5/2007 | Peterson et al. |
| 2007/0112497 | A1 | 5/2007 | Miura et al. |

FOREIGN PATENT DOCUMENTS

| | | |
|---|---|---|
| DE | 39 36 987 | 5/1991 |
| DE | 38 44 803 | 9/1993 |
| DE | 4400685 | 7/1994 |
| DE | 19523354 | 1/1996 |
| DE | 19803370 | 8/1999 |
| DE | 102004008265 | 9/2005 |
| EP | 0963892 | 12/1999 |
| EP | 1147960 | 10/2001 |
| EP | 1350642 | 10/2003 |
| EP | 1355209 | 10/2003 |
| EP | 1403157 | 3/2004 |
| GB | 2 383 567 | 7/2003 |
| JP | 1009011 | 1/1989 |
| JP | 2216310 | 8/1990 |
| JP | 3070633 | 3/1991 |
| JP | 3224814 | 10/1991 |
| JP | 4108014 | 4/1992 |
| JP | 5050825 | 3/1993 |
| JP | 6087342 | 3/1994 |
| JP | 7017277 | 1/1995 |
| JP | 7032845 | 2/1995 |
| JP | 9240242 | 9/1997 |
| JP | 2001354020 | 12/2001 |
| JP | 2004338460 | 12/2004 |
| JP | 2005059851 | 3/2005 |
| JP | 2006136174 | 5/2006 |
| WO | 01/00468 | 1/2001 |
| WO | 2007/010715 | 1/2007 |

* cited by examiner

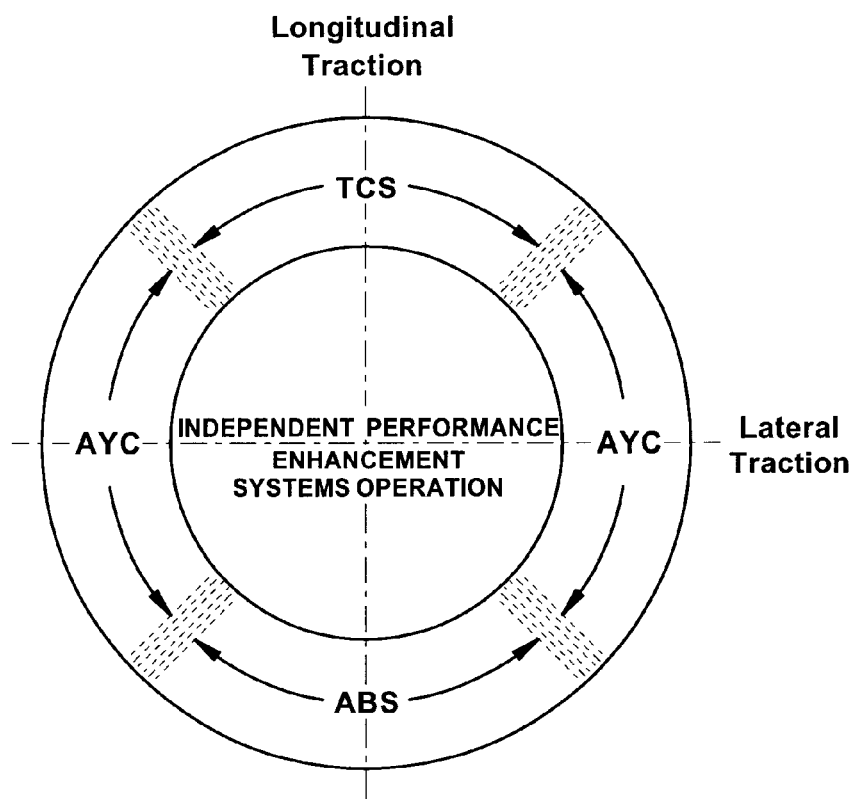
Fig. 2 - VSA
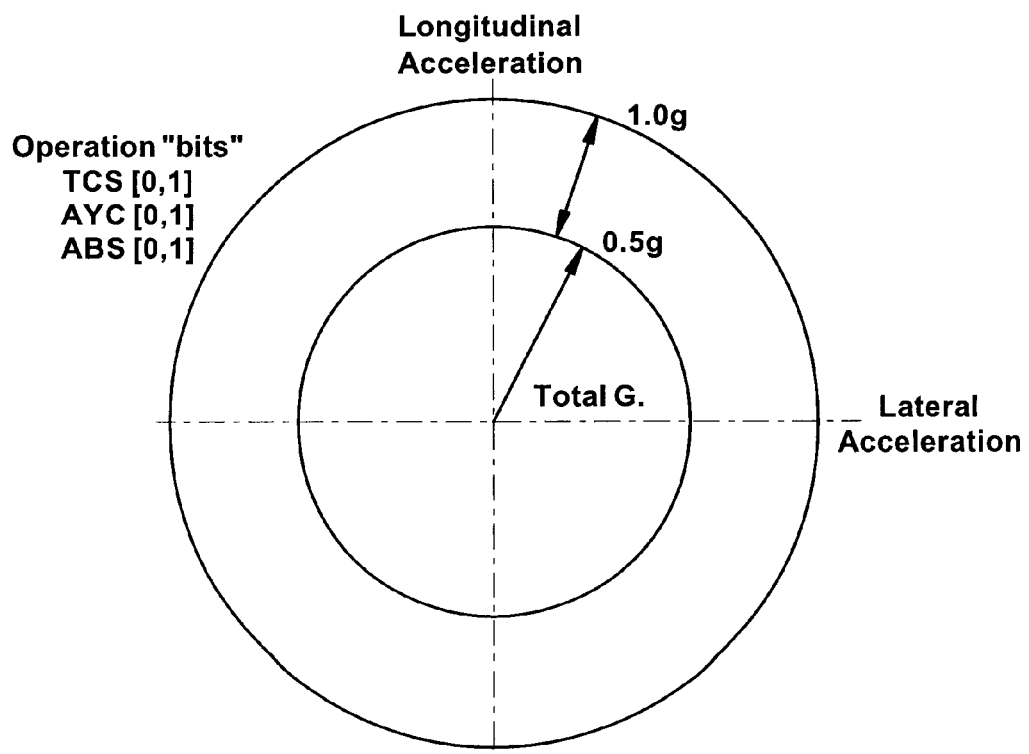
Fig. 3

VEHICLE SYSTEMS CONTROL FOR IMPROVING STABILITY

This application claims priority to U.S. Provisional Application Ser. No. 60/886,536 filed on Jan. 25, 2007, the entire disclosure of which is incorporated by reference herein.

BACKGROUND OF THE INVENTION

Modern vehicles have been increasingly equipped with various chassis control systems, such as an Anti-lock Braking System (ABS), advanced Four Wheel Drive (4WD) systems, Vehicle Stability Assist (VSA) systems, and active suspension systems, such as for example, an Active Damping System (ADS), as ways to further improve vehicle handling quality, drive comfort and stability. However, these chassis control systems usually have been designed and implemented to work independently of one another with only minimal information sharing, although they have been arranged on the same vehicle and may facilitate one another's functions. It is expected that the vehicle overall performance can be further enhanced if the existing chassis control systems are able to share or exchange some operational information.

As an example, in the current state of the art, a vehicle Active Yaw Control system (AYC) is usually designed to control vehicle yaw rate to follow a certain target or desired yaw rate based on some yaw rate reference model. During vehicle operations, AYC constantly monitors the vehicle actual yaw rate and calculates the difference between the actual yaw rate and the target yaw rate (i.e. yaw rate error). When the vehicle yaw rate difference is larger than some preset threshold limit, AYC initiates to regulate the yaw rate by applying a corrective yaw moment through differential braking, for example, applying braking to the outside wheels of the vehicle to mitigate oversteering (OS) or applying braking to the inner-side wheels of the vehicle to reduce understeer (US).

These braking applications are effective in reducing the vehicle yaw rate error and, thus, maintain driver intended line trace while ensuring vehicle stability, but at the same time, because they are braking operations, they slow down the vehicle and are also obtrusive to the driver. In addition, in the case of a vehicle that is also equipped with an active drive torque modulation system, such as Front Wheel Drive (FWD), Rear Wheel Drive (RWD) or 4WD control devices, there is a possibility that while the AYC is applying braking to an individual wheel of the vehicle, the drive torque control system may be still delivering some drive torque to the same wheel, causing conflicting torque control and power wastage.

In another vehicle control situation, the braking efficiency and stability of a vehicle is dependent upon many factors, such as initial speed, surface conditions, wheel load distribution, braking pressure, etc. During normal vehicle braking (where wheels are not significantly slipping), braking pressure is directly related to the driver braking pedal force, while during hard braking with ABS activation, the braking pressure is modulated to regulate wheel slip around some preset optimal region to maximize braking force while maintaining vehicle stability. Since the braking pressure modulation logic does not have any prior knowledge about the wheel loads, whose fluctuations cause considerable variation in achievable braking force and thus compromise braking efficiency, it is desirable that the wheel load variation be kept as small as possible during braking operation.

In yet another situation, tire-road friction and road profile roughness considerably affect ADS performance. For example, on high-mu flat surfaces, such as dry concrete and asphalt roads, ADS is primarily calibrated to control body motion so as to enhance vehicle handling characteristics, while on rough or low-mu surfaces, such as a bumpy road, or snow and ice roads, ADS is primarily set to facilitate driving comfort and drivability. In the current state of art, ADS calibration is usually a trade-off amongst vehicle handling performance on flat high-mu surfaces, ride comfort on bumpy roads, and drivability and stability on low-mu roads.

Different vehicle operation conditions require different ADS settings to achieve optimal overall vehicle performance in terms of handling and body motion control, ride comfort, drivability and stability. For example, for low coefficient of friction operations, a soft ADS setting provides the best drivability and stability, for rough road operation, a moderate ADS setting offers very good road isolation, ride comfort and body motion control, while on high coefficient of friction operations, a firm ADS setting provides best body motion control and handling stability.

Ideally, the ADS setting should be automatically adjusted according to the prevailing operation conditions to enhance vehicle overall performance. However, the current ADS systems only stay on one predetermined setting, often pre-selected by the driver, and do not change setting automatically based directly on sensed road conditions.

In another vehicle control situation within the current state of the art, Traction Control Systems (TCS) are designed to regulate wheel slip around some preset optimal region to maximize wheel traction. During vehicle operation, TCS constantly monitors the slip ratio of each wheel of the vehicle. The slip ratio typically is the difference between wheel speed and vehicle speed, divided by the vehicle's speed or another comparison of wheel and vehicle speed. Whenever excessive wheel slip occurs, TCS brings down the wheel slip to the optimal region through either throttle intervention, braking application or a combination of the two. Since TCS regulates wheel slip on a feedback basis without any prior knowledge about the factors that affect the wheel slip, especially the wheel load (and ground surface friction), whose fluctuations cause considerable wheel slip variation and thus may compromise TCS control efficiency and smoothness, especially during TCS braking operation, it is desirable that the wheel load variation be kept as small as possible during TCS operation.

Therefore, there exists a need in the art for control of a plurality of vehicle subsystems that have not worked together synergistically in the past.

BRIEF SUMMARY OF THE INVENTION

COOPERATIVE-AYC: Considering the above drawbacks associated with the braking applications for vehicle yaw rate correction, it is desirable that the vehicle front to rear drive torque distribution be controlled by a drive torque control actuator to achieve a yaw moment change that is similar to or equivalent to the effect of AYC activated differential braking.

In a first embodiment of the invention, directed to a cooperative Active Yaw Control (AYC) system, a method includes the steps of 1) providing a vehicle stability assist system that determines when the actual vehicle yaw rate deviates from a target yaw rate, wherein the assist system includes an Vehicle Stability Assist-Active Yaw Control (VSA-AYC) ECU, 2) providing a system for delivering/distributing torque, including utilizing a Direct Yaw Control (DYC) Drive Torque Control ECU, to both of the front wheels and both of the rear wheels of the vehicle and shifting torque between the front and rear wheels. Torque is shifted from rear wheels to front wheels either by placing an upper limit on the amount of torque applied at each rear wheel or by reducing the amount of torque applied at each rear wheel by an equivalent amount.

Additionally the system allows for shifting the torque distribution side to side between wheels on the front axle and wheels on the rear axle in order to correct the yaw deviation.

COOPERATIVE-ADS: Considering the above drawbacks associated with the braking efficiency and wheel load variation that affects vehicle stability, a second embodiment of the invention provides a control concept that adjusts ADS damping force distribution during braking operation to enhance braking smoothness and stability and thus is considered to be a cooperative ADS system.

The ADS system continuously operates independently from the ABS system (normal operation) except in the event that ABS becomes active. According to this embodiment, an ADS Electronic Control Unit (ECU) constantly monitors the vehicle's braking status. When the braking system (ABS) is activated by the driver, the ADS ECU determines that the vehicle is in a slip-controlled braking operation or in a state where differential braking is applied to affect vehicle yaw stability (electronic brake distribution, EBD, control which may be just below the point of tire slip) and temporarily overrides the normal ADS control by switching to a braking-event based control setting with appropriate firm damping calibration to reduce vehicle body motion and wheel load variations so as to facilitate braking efficiency and vehicle stability. After a fixed period of time has expired, representing a critical braking period, the ADS reverts back to the setting prior to application of the brakes.

In a third embodiment of the invention, which like the second embodiment is directed to cooperative ADS, available road surface information is inferred by the VSA system and is used to eliminate the trade-off of ADS capabilities under different road conditions and thus maximize ADS potential benefits. This embodiment includes a preemptive ADS control concept and implementation, which makes use of available VSA determined road surface friction and roughness information to adjust ADS calibration based on prevailing road conditions provided by the VSA system, and to enhance vehicle performance under all surface conditions.

The third embodiment uses existing surface information inferred by a VSA system equipped in the same vehicle, thus improving ADS performance with minimum cost. This invention eliminates the trade-off of ADS performances under different road conditions and, thus, maximizes the ADS potential benefits.

The method for providing enhanced vehicle overall maneuverability, ride comfort, and stability in this embodiment includes the steps of: providing an ADS for adjusting the suspension characteristics on the vehicle, providing a VSA system on the vehicle, using the VSA system to infer the coefficient of friction of the road upon which the vehicle is traveling by checking the operational status of an ABS, TCS and AYC control systems and a vector representation of longitudinal and lateral acceleration of the vehicle, and upon inferring the coefficient of friction of the road, changing the damping state of the ADS as follows: If the coefficient of friction is high, the damping state of the ADS is adjusted to a firm setting. If the coefficient of friction is low, the damping state of the ADS is adjusted to a soft setting.

Considering the above drawbacks associated with TCS operation, in a fourth embodiment of the invention, also considered cooperative ADS, a method for providing enhanced vehicle stability is provided that includes providing an Active Damping System (ADS) for adjusting the suspension characteristics on the vehicle, providing a Traction Control System (TCS) on the vehicle, and using the TCS to determine the slip ratio at each wheel of the vehicle so that if the slip ratio is high at a wheel, the suspension in an area adjacent to that wheel is stiffened.

Further, regarding the above drawbacks associated with the braking applications for vehicle yaw rate correction, in a fifth embodiment of the invention, also considered cooperative-ADS, a method for providing vehicle stability is provided that includes the steps of providing a vehicle stability assist (VSA) system that determines yaw offset from a desired position, the system including a vehicle stability assist-Active Yaw Control electronic control unit (VSA-AYC ECU), providing an Active Damping System (ADS) for adjusting the suspension stiffness on the vehicle, at least independently between the front and the rear of the vehicle, and shifting the front to back damping distribution using the ADS in order to correct the yaw deviation.

COOPERATIVE-TCS: In a sixth embodiment of the invention, involving cooperative TCS operation, a method is provided which includes providing a Traction Control System (TCS) on the vehicle, using the TCS to determine the slip ratio at each wheel of the vehicle, providing a system including a DYC drive torque control ECU for selectively delivering torque to each of the front wheels and rear wheels of the vehicle in different amounts if desired, and shifting the front to back torque distribution between wheels on the front axle and wheels on the rear axle in order to correct the detected wheel slippage.

Also directed to cooperative TCS operation, in a seventh embodiment of the invention, a method of stabilizing a vehicle is shown including the steps of providing a Traction Control System (TCS) on the vehicle, using the TCS to determine the slip ratio at each wheel of the vehicle, providing a system including a DYC drive torque control ECU for selectively delivering torque to each of the front wheels and rear wheels of the vehicle in different amounts, and shifting the side to side distribution of torque between wheels on the front axle and wheels on the rear axle in order to correct the detected wheel slip.

As previously stated, tire-road friction and road profile roughness considerably affect torque control system calibration and performance. For example, on high-mu flat surfaces, such as dry concrete and asphalt roads, drive torque control is primarily set to improve turning capability (cornering performance) and driving pleasure, while on rough or low-mu surfaces, such as a bumpy road, or snow and ice roads, drive torque control is primarily calibrated to improve vehicle traction, drivability and stability. In the current state of art, because the drive torque distributions do not change regularly, drive torque control system calibration is usually a trade-off of vehicle handling performance on flat high-mu surfaces, and drivability and stability on low-mu surfaces, which unavoidably limits drive torque control system potential capability. However, the drive torque distribution does not currently change settings based directly on sensed road conditions.

In an eighth embodiment of the invention, a method for providing vehicle stability is shown that includes the steps of providing a vehicle with all wheel drive, providing a Vehicle Stability Assist (VSA) system on the vehicle, using the VSA system to infer the coefficient of friction of the road upon which the vehicle is traveling, providing a DYC Torque Control Electronic Control Unit capable of adjusting the drive torque at each vehicle wheel, and upon determining the coefficient of friction of the road, changing the distribution of torque amongst the vehicle wheels as follows: if the coefficient of friction is inferred to be high, implementing a strong side to side and front to rear torque bias; and if the coefficient of friction is inferred to be low, implementing a moderate side to side and front to rear torque bias.

These and other aspects of the invention are described herein with further reference to the figures.

BRIEF DESCRIPTION OF THE DRAWINGS

FIG. 2 is a schematic showing where specific vehicle control systems operate;

FIG. 3 is a schematic showing the basis of a method for inferring road surface conditions;

DETAILED DESCRIPTION OF THE INVENTION

Figure 1:
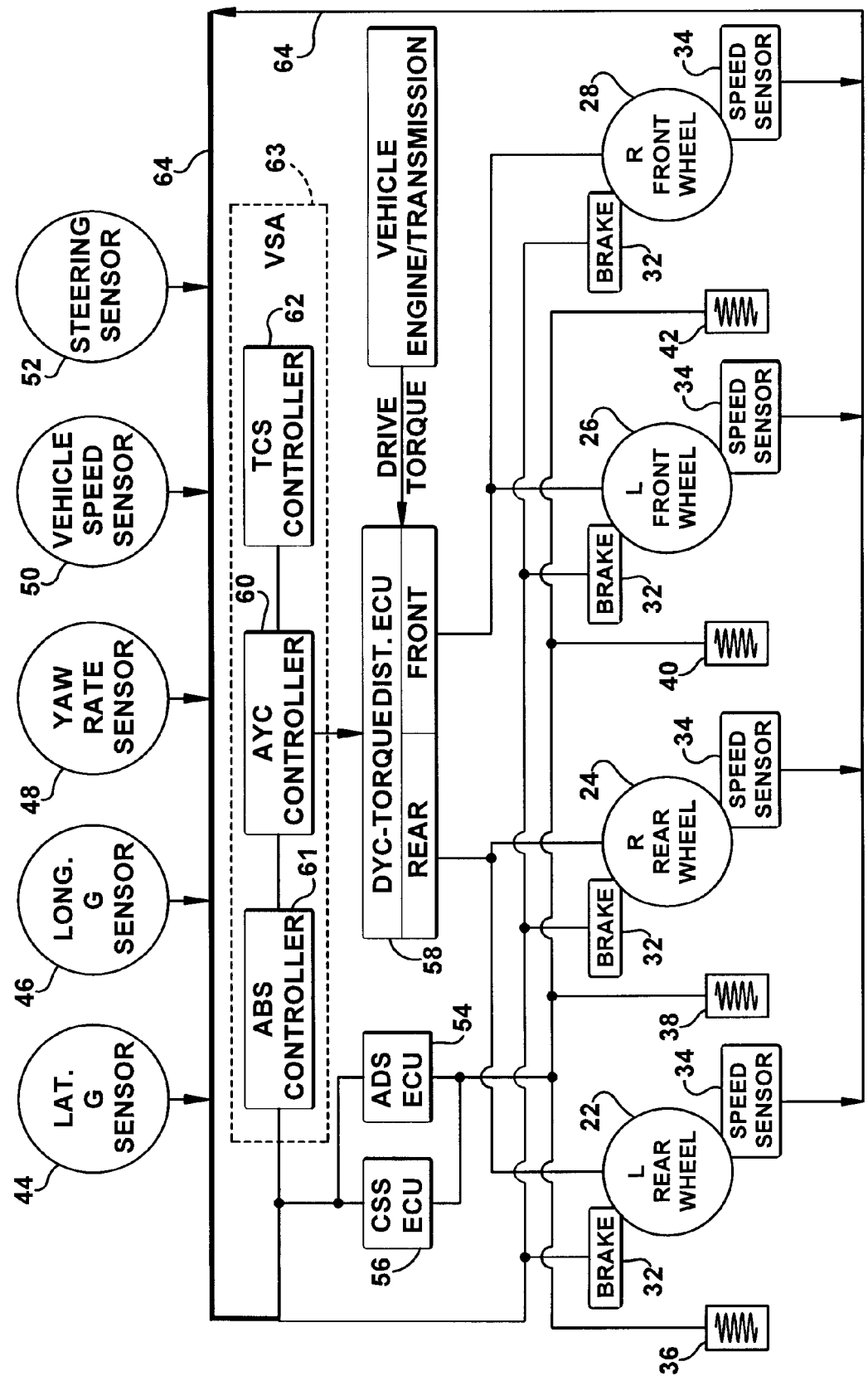
FIG. 1 is a schematic showing interaction between vehicle components.

The invention is directed to a method of the hierarchical control of stability systems within a vehicle. Referring to FIG. 1, the vehicle, in general, includes four wheels 22, 24, 26, 28; each wheel includes an associated brake 32 and speed sensor 34. The vehicle also includes a controllable suspension, typically including at least four (rear left 36, rear right 38, front left 40, front right 42) zones that are individually controllable (spring rate, damper rate).

The vehicle also includes at least the following sensors: lateral vehicle acceleration sensor 44, longitudinal vehicle acceleration sensor 46, yaw rate sensor 48, vehicle speed sensor 50, and steering sensor 52.

The vehicle includes at least the following performance enhancement systems as further described below: Active Damping System (ADS) 54, Controllable Suspension System (CSS) 56, Direct Yaw Control (DYC) Torque Adjustment/ Distribution System (such as a continuously controllable 4WD, FWD, or RWD) 58, each having an associated electronic control unit (ECU).

The vehicle includes the following stability systems, as further described below: Active Yaw Control System (AYC) 60, Anti-lock Braking System (ABS) 61, and a Traction Control System (TCS) 62 each having an associated electronic control unit (ECU) or each system incorporated into a common ECU in the VSA.

Referring to FIGS. 1 and 2, a Vehicle Stability Assist (VSA) system 63 is illustrated and comprises one or more of the vehicle stability systems AYC 60, ABS 61, and TCS 62. As shown, depending on the measured longitudinal and lateral traction of the vehicle as well as the slip conditions of individual wheels, one or more of these stability systems activates to control the vehicle stability providing improved vehicle yaw response and wheel traction. These systems are designed to be reactive feedback control systems and therefore activate in a boundary that is near the limit of adhesion of the road surface. In general, TCS works most strongly during acceleration in a straight line, AYC while turning and ABS during limit braking events. Also, more than one stability control system may operate at the same time. In a range that is well within the road adhesion limits (shown in the middle of FIG. 2), the stability control systems are generally not active.

Performance enhancement systems ADS 54, CSS 56, and DYC Torque Distribution Control 58 work at all levels of lateral and longitudinal traction and are not necessarily restricted by the proximity to the road adhesion limits. In the same way that stability control systems (ABS, AYC and TCS) may operate simultaneously, there is an opportunity for performance enhancement systems (ADS, CSS, DYC Torque Distribution Control) to also operate simultaneously in areas of overlap in FIG. 2.

Communications between the ADS ECU 54, CSS ECU 56, ABS ECU 61, Torque Distribution ECU 58, AYC ECU 60, TCS ECU 62 and sensors occur within a Controller Area Network (CAN) 64. The CAN 64 is preferably wiring running throughout the vehicle.

ACTIVE DAMPING SYSTEM (ADS): The vehicle's controllable suspension includes the Active Damping System (ADS) 54 which is active at all times. The Active Damping System 54, in normal operation, gives the vehicle an elevated level of handling precision, while maintaining a smooth and controlled ride. The ADS 54 includes, preferably, electronically controlled, fast-acting Magneto-Rheological fluid dampers and achieves outstanding levels of handling response while maintaining refined levels of ride comfort. The quick response of the dampers in combination with computer algorithms produce fast-acting vertical force modulation at each corner of the vehicle to result in smooth vehicle body movements and provide the driver intuitive vehicle control in a relaxed environment—free from neck straining head toss and other sudden vehicle motions.

The dampers of the ADS 54 are fast-acting "semi active shock absorbers". These dampers offer the ability to individually adjust from minimum to maximum damping force very quickly. Each damper carries a field coil that generates an electromagnetic field when current is passed through it. The fluid within the dampers contains microscopic (on the order of 10 microns in diameter) ferric spheres that align when surrounded by the electromagnetic field, dramatically and instantly changing the effective fluid viscosity within the damper. The overall range of damping force available is significantly more than that of a conventional damper as it is dependent on the control current being applied to the damper. Additionally, there is a continuum of damping force steps within the range of the lower and upper capacity of the damper.

The current that passes through the field coils is controlled by the ADS ECU 54 that uses special algorithms to determine the best control for the road conditions. This, combined with nearly instantaneous reaction time of the dampers, allows damping control to occur before the vehicle's tires or body are allowed to have extraneous motion. Active dampers can run with low damping when the road is smooth and level and the vehicle is being driven at a constant speed. This further reduces the amount of vibration and harshness that passes from the suspension to the body, quieting and improving the vehicle's ride quality.

Using the dampers' fast response time, the ADS 54 reacts to sudden changes in driver or road inputs. The high damping force achieved in this short time allows the dampers to aid the springs and stabilizer bars in roll, pitch and heave (vertical body motion) control, greatly improving the handling of the vehicle.

In alternative variations, the ADS 54 comprises rotary valve dampers or controllable disc dampers instead of a Magneto-Rheological fluid dampers.

A result is the improved transient handling, road isolation, and body control of the vehicle with the Active Damping System 54, which noticeably reduces the driver's workload. The ADS 54 is able to achieve the benefits of a sporty suspension without the traditional ride comfort tradeoffs.

Figure 4:
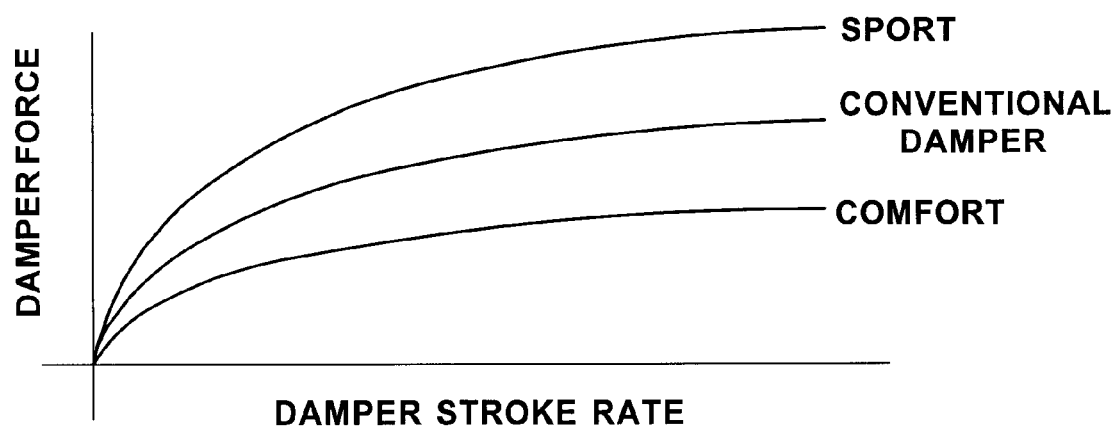
FIG. 4 is a graph showing the operating range of a damper within an Active Damping System.

FIG. 4 shows the adjustable range of a damper in a Active Damping System 54 as compared to a conventional damper. Because the ADS 54 system has this large range of capability, it is feasible to employ a number of driver-selectable control gain settings. The ADS 54 preferably provides at least the driver-selectable settings—Sport (firm), and Comfort (soft). Sport mode prioritizes handling response, vehicle body control and tire adhesion to allow for spirited driving with high levels of precision and composure. Sport mode keeps the vehicle body as flat as possible in motion. Comfort mode allows for a more relaxed driving experience by prioritizing road isolation and reducing passenger fatigue caused by road inputs while still providing sufficient damping for overall vehicle motion control. Comfort mode allows for greater vehicle body movement when the vehicle is in motion. Either of the two modes can be used in any type of operating conditions as selected by the driver. Alternatively, the mode may be selected directly by the ADS ECU 54. Other settings are possible that are located between Sport mode and Comfort mode.

The vehicle also includes a Controllable Suspension System (CSS) 56 that controls the spring rate in each of the four suspension zones. The Active Suspension System 56 includes a CSS ECU 56.

DYC TORQUE DISTRIBUTION SYSTEM: The driving torque that is applied to each axle or wheel is individually adjustable. The amount of torque generated by the engine is controllable by throttle adjustment or other known means. The engine torque is then distributed between the two axles and/or four wheels, the amount directed to each wheel being controllable using slip clutches or other means known in the art. The vehicle distribution system may be a 4 wheel drive system (4WD) where addition/reduction can be made at any of the four wheels, and on an axle by axle basis (front to rear axle) or a system where the torque is varied between the left and right wheels on a common axle (FWD, RWD).

The variations of vehicle drive torque distribution (also referred to as calibration) depend upon the torque control components in a vehicle. If the vehicle is a DYC four wheel drive (DYC all wheel drive) vehicle, torque is distributed between the front axle and the rear axle as well as between the two wheels on the rear axle. In this DYC 4WD system, torque control components comprise a conventional front wheel drive system (engine, transmission, driveshafts) with an attached transfer case that distributes drive torque to a propeller shaft running to the rear axle of the vehicle. At the rear axle, the system includes a rear drive unit that contains multi-plate controllable slip clutches at either side of the unit which direct power to output driveshafts that transmit torque to each of the rear wheels. By varying the pressure symmetrically on each of the two clutches hydraulically or electronically, torque distribution between the front and rear axles is continuously shifted. By varying the pressure in different amounts between the right and left clutches, torque may be continuously distributed to either side of the axle, more or less to each side depending on the control. The two clutches, being activated either symmetrically or asymmetrically can deliver a pre-described front/rear torque distribution as well as a rear side-to-side distribution simultaneously. This can be performed in a continuous manner with infinitely adjustable levels of front/rear and rear side/side distribution. Hence it is termed a direct yaw control (DYC) system.

In a torque distribution control system including front wheel driving capabilities, a clutch activated system can distribute the available driving torque between the left and right front wheels according to the same principles as the rear drive unit in the 4WD system discussed above. This distribution can be made in a vehicle having only front wheel drive or a vehicle with four wheel drive.

In a torque distribution control system including rear wheel driving capabilities, the operation would be the same as the aforementioned FWD-based system except that the rear axle is the drive axle. This distribution can be made in a vehicle having only rear wheel drive or a vehicle with four wheel drive.

Torque distribution is controlled by a torque distribution ECU 58.

VSA-ABS CONTROL SYSTEM: The ABS 61 is composed of a central electronic control unit (ECU), four speed sensors 34 (one for each wheel), and two or more hydraulic valves on each brake circuit. The ABS ECU 61 constantly monitors the rotation speed of each wheel. When it senses that any number of wheels are rotating considerably slower than the others (a condition that will bring it to lock) it adjusts the valves to decrease the pressure on the braking circuit, effectively reducing the braking force on that wheel. Wheel(s) then turn faster and when they turn too fast, force is reapplied. This process is repeated continuously, and this causes the characteristic pulsing feel through the brake pedal.

Application of the brakes is sensed by the ABS ECU 61 in any one of a number of manners: by actual application of pressure to the brake pedal, sensed pressure at the master cylinder, sensed longitudinal acceleration "g", or sensed lateral acceleration "g".

VSA-AYC CONTROL SYSTEM: Referring back to FIG. 1, The Active Yaw Control (AYC) system includes an AYC ECU 60 that limits the overall wheel slip and/or lateral skid and/or yaw motion through braking and driveline torque modulation to achieve stable vehicle response. The AYC ECU 60 is designed to operate in a slip-based and/or lateral skid-based and/or yaw rate feedback manner and is designed and implemented with high fidelity for this purpose. The AYC controller 60 has the capability to: Calculate a reference vehicle speed; Calculate each wheel's longitudinal slip condition (either longitudinal slip rate or lateral skid); Compare to a threshold speed and/or longitudinal slip and/or lateral skid; Judge the proximity to a potentially unstable vehicle motion; and, Calculate a required application torque (brake or otherwise) to control wheel spin and/or wheel lateral skid and/or vehicle motion.

The AYC ECU 60 receives signals from the yaw rate sensor 48, wheel speed sensors 34 and from other vehicle parameter sensors in the vehicle and determines, based upon predetermined control algorithms, whether one or more of the wheels is either slipping and/or skidding laterally (feedback-based control) or about to slip and/or skid laterally (feed-forward based control) or if the vehicle is progressing into a region of unstable motion. The AYC ECU 60 calculates the necessary wheel brake torque (or actuation force), the necessary throttle angle adjustment, and the necessary drive torque reduction amount for the slipping and/or laterally skidding wheel(s). The AYC 60 also monitors the braking status of the vehicle.

VSA-TCS CONTROL SYSTEM: The TCS control system includes a TCS ECU 62 that has sub-algorithms that receive information from the wheel speed sensors 34 for each wheel, and provide torque change commands associated with each of the wheels and an engine ECU that is operable to control operation of the engine, namely the throttle angle, to affect engine output torque.

The TCS ECU 62 is in communication with brake systems 32 for each wheel, and with controls for individual wheel torques and the overall engine torque. There are several ways to implement the improved cooperative traction control made possible by independently controlling the individual drive torques for each of the wheels.

When wheel-slippage is detected at any wheel, the TCS ECU 62 pulses the brakes until traction is regained and all four wheels are again traveling at the same speed. The TCS system 62 is very effective at low speeds and when the vehicle is on a split traction surface.

Figure 11A:
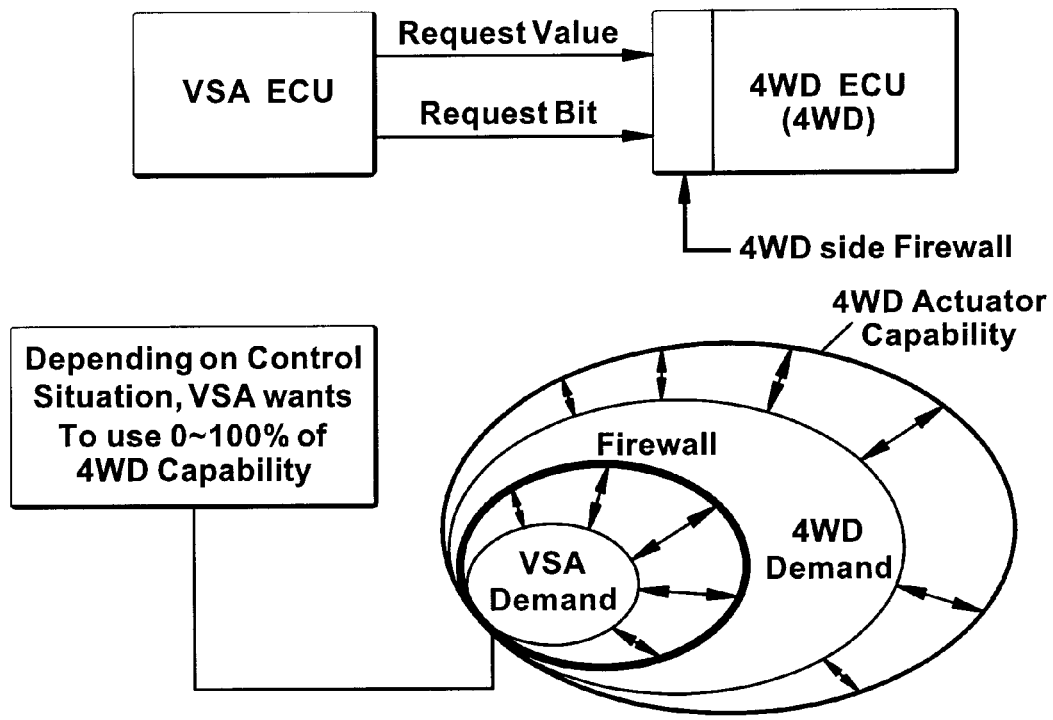
FIG. 11A is a schematic showing the firewall function of the 4WD Control System used to regulate the available control authority being requested by the VSA.

Referring to FIG. 11A, a firewall feature of the VSA is shown. Specifically, the VSA is prevented from utilizing the full capacity of any one of the performance enhancement systems (Torque Distribution System 4WD is shown as an example). The performance enhancement system maintains a certain degree of autonomy, and this acts as a checking mechanism. The VSA can not force the performance enhancement system to completely override the system's independently generated control function.

Figure 11B:
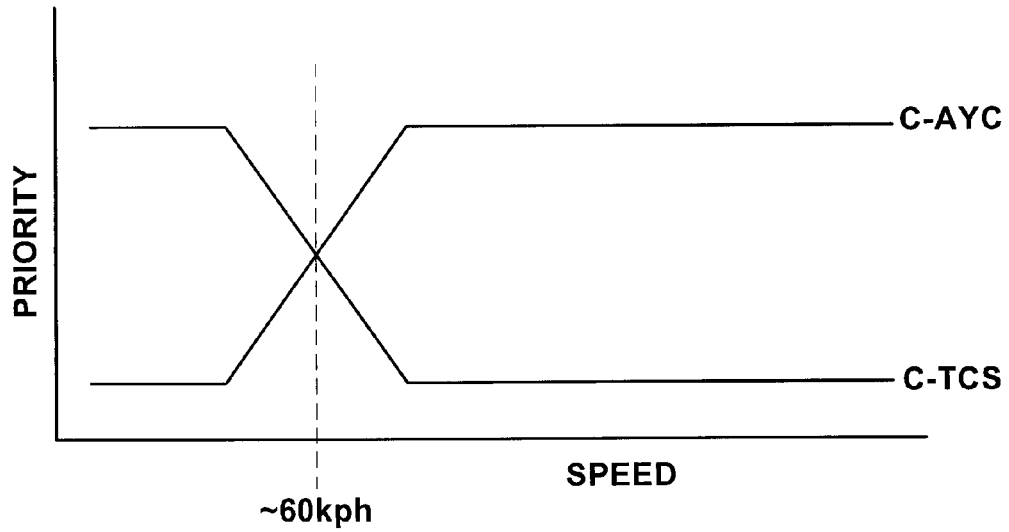
FIG. 11B is a graph showing how priority is determined between two operating control systems.

Referring to FIG. 2 and FIG. 11B, it can be seen that at certain conditions of longitudinal traction and lateral traction, both the AYC and TCS control systems may be active concurrently. Because each stability control system may be controlling the same performance enhancement system(s), priority to one control system must be given. FIG. 11B shows that priority is decided based on the speed of the vehicle. Thus, for example, the torque distribution performance enhancement system, such as 4WD, first receives commands from a feed-forward control based logic. These commands are then superceded, if necessary, by the TCS stability control system at a higher (>60 kph) vehicle speed. Note, that any commands from the TCS control system are first subject to a firewall, as previously described before being implemented by the 4WD. These commands however are superceded, if necessary, by commands from the AYC performance enhancement system. Note that any commands from the AYC control system are also first subject to a firewall before being implemented by the 4WD.

Distinct embodiments of the invention are described below.

COOPERATIVE YAW STABILITY BY MODULATING INDIVIDUAL AXLE DRIVE TORQUE: Referring to FIGS. 1 and 2, the first embodiment of the invention is concerned with reducing AYC differential braking intervention during stability events that have combined acceleration and turning (refer to the upper portion of FIG. 2). Through drive torque control cooperation, modulation of individual wheel driving torque (as controlled through the DYC torque distribution system) can reduce the yaw moment leading to an unstable motion to improve VSA yaw rate control smoothness and driver perception, especially during vehicle acceleration on low-mu road surfaces. According to this embodiment, the DYC drive torque distributor ECU 58 constantly monitors the AYC operation states such as AYC activation flags, vehicle stability factor and oversteer (OS)/understeer (US) indicators, which can be estimated based on the vehicle yaw rate error, AYC activation modes, target pressures, etc.

This embodiment is directed to controlling the yaw rate of a vehicle in a manner that includes primarily shifting the distribution of torque between the front and rear wheels. As described in more detail below, a Yaw Stability Control Algorithm receives information regarding the vehicle state from the sensors. The AYC ECU 60 compares the measured yaw state to a desired yaw operating state. The desired yaw operating state is set during vehicle manufacture/testing by mapping yaw at different vehicle speeds and steering angles. The AYC ECU 60 then determines if yaw control is required to maintain a real yaw response to within a specified error to the desired yaw rate. If yaw control is required, the AYC ECU 60 calculates the amount of redistribution of drive torque required and sends instructions to the DYC Drive Torque Control ECU 58. If additional yaw correction is required, the brakes 32 are subsequently applied accordingly.

Figure 5A:
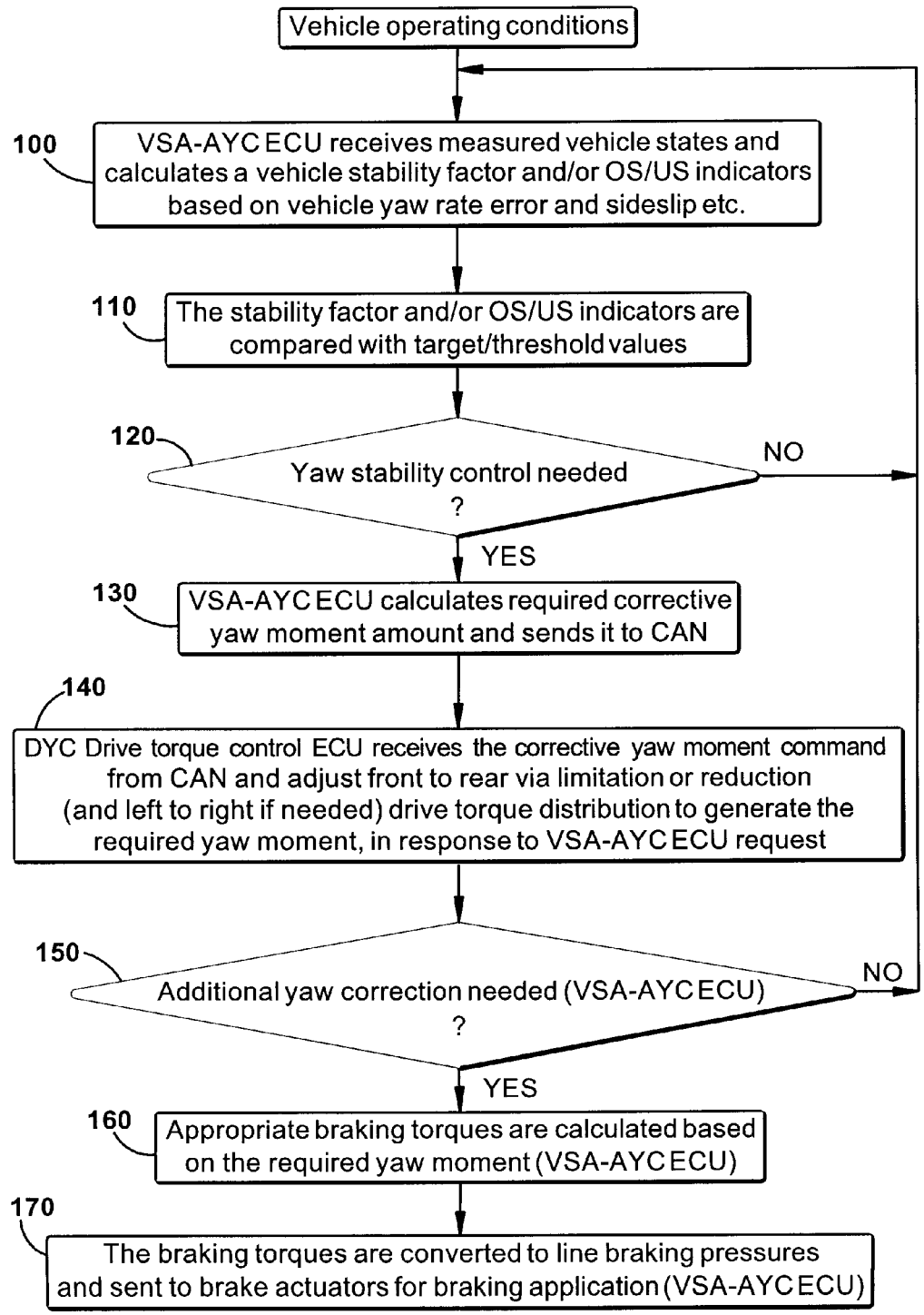
FIG. 5A is a flowchart showing steps within a first embodiment of the claimed invention.

Referring to FIGS. 1 and 5A, the AYC ECU 60 is shown receiving, via the CAN 64, vehicle status information. This information includes information from one or more of the following: vehicle motion sensors including longitudinal and lateral acceleration, wheel speed sensors, steering sensors. This information is used to determine wheel speed changes and vehicle motions including body lateral slippage. The wheel speed changes and vehicle motions are compared to stability operational boundaries in the AYC ECU 60 to determine whether one or more wheels are slipping and/or skidding laterally, or about to slip and/or skid laterally and/or whether the vehicle is progressing into a region of unstable motion, and whether the actual or anticipated wheel slip and/or lateral skid needs to be reduced. It is noted that many algorithms are known in the art to qualify and quantify wheel slip and/or lateral skid and/or stable vehicle motion and that many of these known algorithms may be used by the AYC ECU 60.

Referring to step 100 of FIG. 5A, based on the information received, the AYC ECU 60 calculates a vehicle stability factor and/or generates an oversteer (OS) or understeer (US) indication. The vehicle stability factor and/or OS/US indicators are then compared with the pre-mapped target values for vehicle stability and OS/US. The target values represent the vehicle operating in a stable condition.

Referring to step 110, depending on the difference between the calculated vehicle stability and/or OS/US indicators and the target values, yaw stability corrective action is or is not required. Referring to step 120, if yaw stability correction is not required, the AYC ECU 60 does not institute any changes. If yaw stability is required, the AYC ECU 60 calculates the required corrective yaw moment.

Referring to step 130, the AYC ECU 60 then calculates the required shift in torque between the front wheels and rear wheels of the vehicle to achieve the corrective yaw moment. The torque change request is provided from the AYC ECU 60 to the DYC Drive Torque Control ECU 58 via the Controller Area Network 64. Referring to step 140, the DYC Drive Torque Control ECU 58 receives the torque distribution request and implements the request accordingly by shifting drive torque from the rear wheels to front wheels of the vehicle. For the case of oversteer mitigation, this is done by either enforcing an upper torque limit on each rear wheel torque or reducing the torque applied to each rear wheel in an equivalent manner. When an upper limit is applied, if either wheel is already below the limit, no torque is shifted from that wheel. In a reduction instance, torque is always reduced from both wheels. For the case of understeer reduction, the same approach would be used to reduce front axle torque by either imposing an upper limit value or reducing the torque on both front wheels accordingly.

According to this proposed method, the DYC Drive Torque Control ECU 58 constantly monitors the AYC operation states such as AYC activation flags, vehicle stability factor and oversteer (OS)/understeer (US) indicators generated by the AYC ECU 60, which can be estimated based on the vehicle yaw rate error, AYC activation modes, target pressures, etc.

Referring to step 150, the AYC ECU 60 determines if the corrective yaw moment shift resulting from the drive torque distribution carried out in step 140 was sufficient to provide a desired yaw rate correction. If the shift was sufficient, the AYC ECU 60 returns to monitoring the vehicle sensors for further changes in vehicle conditions. Referring to step 160, if the shift was not enough to reach the desired change in vehicle conditions, the appropriate amount of braking torque required to obtain the yaw rate change is calculated. Referring to step 170, the required braking torque is then converted to line braking pressure and sent to the brake actuators 32 for braking application.

Figure 5B:
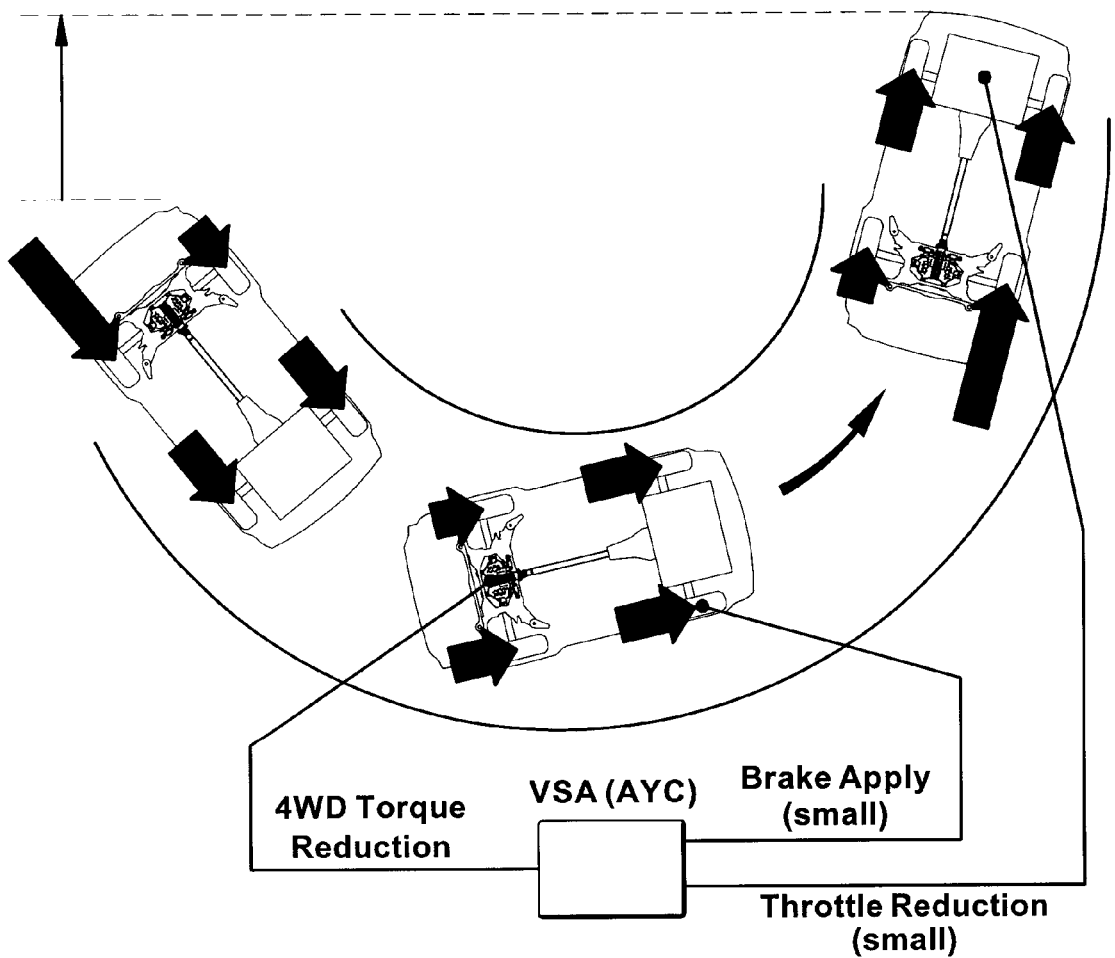
FIG. 5B is a schematic showing torque shifting caused by Cooperative AYC on a vehicle when cornering.

FIG. 5B illustrates the shift of torque and other compensation on a vehicle which is accelerating and turning in a curve. The first schematic shows a representative drive torque distribution resulting from the feed-forward control of a DYC Torque Distribution System. In this example, the drive torque is biased more towards the rear, outside wheel to take advantage of the vertical load on the tires and to create an inward yaw moment to reduce understeer. When operating near the limit, it is feasible that a perturbation of the road mu (icy patch for example) can initiate an oversteering movement to the point that a corrective yaw moment must be introduced by the AYC controller to mitigate the oversteer. In this case, the AYC controller would impose a limitation on the rear axle torque leading to the corrected distribution in the second schematic (center). The rear outside wheel torque is reduced and this surplus is re-directed back to the front axle via the DYC Torque Distribution System in the manner explained above in the AYC discussion. Since the torque limiter value is larger than the inside-rear wheel value prior to the AYC intervention, it's value in the second schematic is unchanged. Once the changes in yaw moment produced by the torque re-distribution in the second schematic correct the yaw motion, the AYC generated torque limiter is removed and the DYC Torque Distribution System restores the distribution back to the original one prior to the intervention (shown in the $3^{rd}$ schematic at the right). In the process, if the restoring moment created by the torque limitation is sufficient to correct the yaw motion, then nearly no additional brake application (shown as small) nor throttle reduction (shown as small) is required to maintain stability and turning.

In an alternative of this embodiment of the invention, the AYC ECU 60 does not calculate the correct amount of torque distribution between the front and rear wheels of the vehicle to achieve the desired corrective yaw moment, but instead the DYC Drive Torque Distribution Control ECU 58 determines the correct amount. Also, if sufficient torque reduction is not achieved via torque shift and brake application, engine torque reduction may be implemented as shown in the third vehicle schematic of FIG. 5B.

Additionally, if the torque distribution system is a four wheel drive system, the AYC ECU 60 may request that the DYC torque distribution system shift torque from the left wheel to the right wheel (or vise-versa) on either the front axle, rear axle, or both.

Figure 5C:
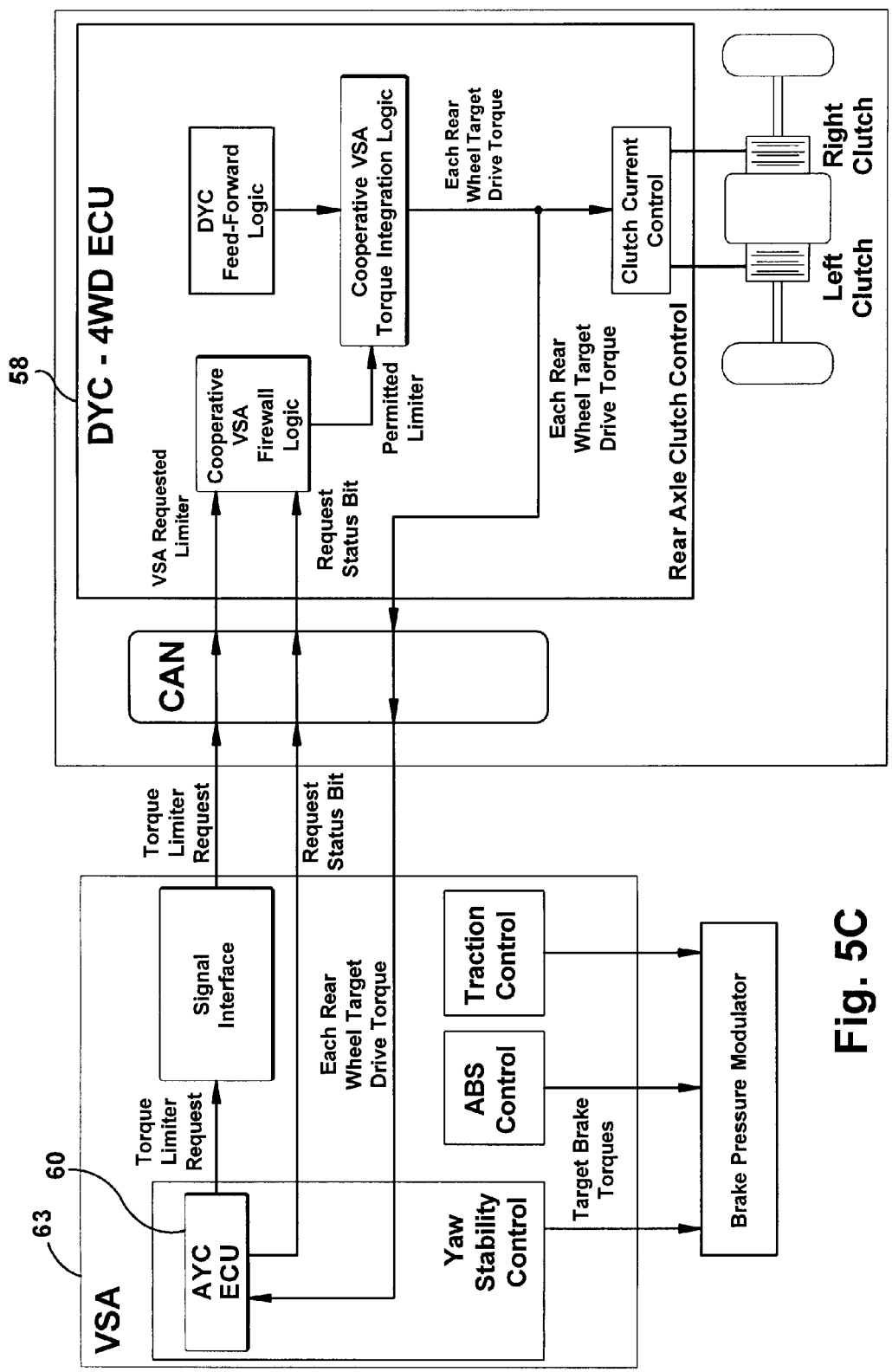
FIG. 5C is a flowchart showing firewall operation.

A section of FIG. 5C illustrates use of a firewall within the present embodiment. A torque limiting request from the AYC 60 within the VSA passes through a VSA firewall, then to the DYC torque distribution ECU (4WD) via the CAN, where a signal interface within the torque distribution ECU interprets the request, as described above, before it is implemented.

This embodiment is concerned about reducing VSA-AYC differential braking intervention through a drive torque control cooperation to improve VSA yaw rate control smoothness and driver perception, especially during vehicle low-mu accelerations. The concept is more efficient in correcting the yaw motion compared to existing brake-only systems when considering the driver's intention to continue acceleration through the turn. Braking forces generally slow the vehicle speed while a re-distribution of the driving torque away from critical wheels keeps the same overall drive torque and does not inhibit forward momentum. This Cooperative Direct Yaw Control can also occur earlier than conventional "brake only" control because the DYC Torque Distribution System control components do not create noise and vibration that is perceivable to the driver or occupants. A more refined control entry condition can be used without risk of excessive noise and vibration within the sub-limit operational range of FIG. 2 which is a practical development constraint of typical brake VSA systems. In feedback systems that utilize brake and throttle control as a means to stabilize yaw motion, control activation thresholds must be set large enough such that perturbations in measured vehicle parameters (yaw rate, lateral g, etc.) do not extraneously cause the VSA to enter control when not needed (example: driving on a vertically varying road combined with turning, or driving on a banked road while turning). Without setting the thresholds high enough, unnecessary activation can occur leading to undesirable brake activation noise and/or vehicle hesitation through throttle control. Since the DYC AWD system's operation shifts drive torque to various wheels without any noise or vibration, then control entry thresholds can be set low to initiate control sooner than in typical brake and throttle only control systems.

Figure 6:
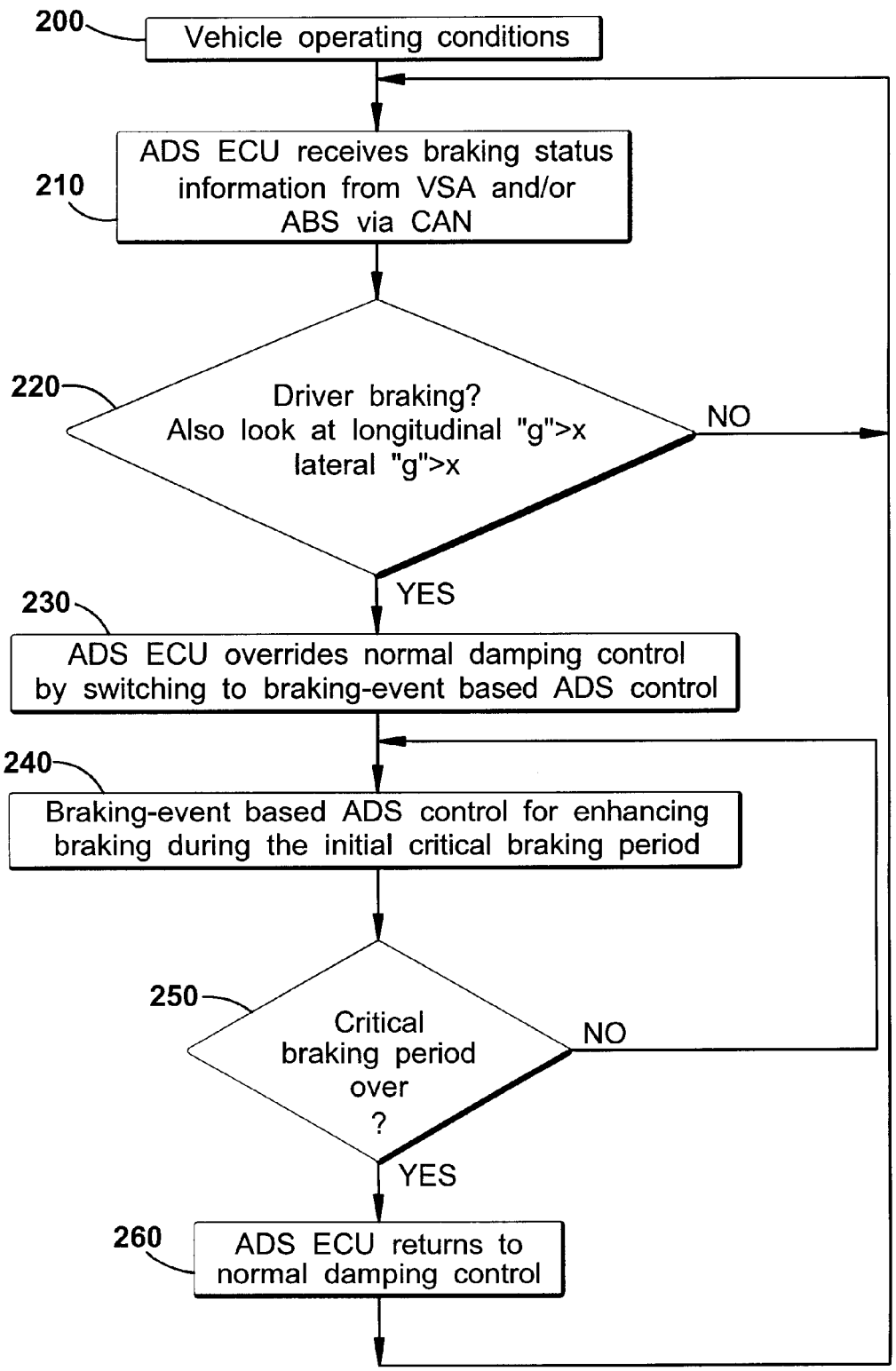
FIG. 6 is a flowchart showing steps within a second embodiment of the claimed invention.

COOPERATIVE ADS CONTROL: Referring to FIGS. 1 and 6, a second embodiment of the invention including an improved method of controlling the stability of a vehicle is provided. This embodiment uses recognition of vehicle braking, determining the present state of an active damping system in the suspension of the vehicle, and then modifying the settings of the active damping system, if necessary, to stiffen the suspension, thus, preventing a significant shift of load in the vehicle and providing better vehicle stability. The present embodiment's adjustment of the ADS damping characteristics to minimize vehicle body motion and wheel load variations results in improving vehicle braking smoothness and stability, especially during combined braking in turning maneuvers on high mu roads. In high mu braking situations, there is considerable movement of the vehicle body which results in larger load variations at the wheels. Therefore, a stiffer suspension damping in these situations allows for better contact between the tire and ground.

Known braking and ADS systems usually work independently of each other with only minimum information sharing, such as braking and ADS operational status, etc. The present embodiment of the invention uses braking activation state information to adjust ADS damping characteristics to minimize vehicle body motion and wheel load variations for the purpose of improving vehicle braking smoothness and stability.

With reference to FIG. 6, the improved method of vehicle stability control is described. In step 200, readings of the vehicle operating conditions 200 are made, including wheel speed, longitudinal acceleration, lateral acceleration, etc. and the decision to enter into ABS control is decided by the ABS controller 61. In step 210, information regarding the braking condition of the vehicle (ABS active or not) is sent to the ADS ECU 54 via CAN. In step 220, a limit braking condition is determined based on the relation between the measured total G (refer to FIG. 3) and the operational status of the ABS (either operating or not operating). If the total G (vector sum of the lateral and longitudinal G) is beyond a specified threshold (for example 0.5 g to correspond to braking on a high mu surface while turning) and the ABS is active, then the vehicle behavior inferred by the ADS ECU 54 is near limit braking event on a high mu surface. Note, "g" is the gravitational acceleration constant. As a second or complementary control entry condition, if the total G is above the specified threshold and ABS has entered electronic brake distribution (EBD) control (wheels not yet slipping longitudinally but the ABS judges that a redistribution of brake torque from the current one to one more aligned with estimated wheel loads and/or a corrective yaw moment is necessary to prevent a slipping situation), then the vehicle behavior inferred by the ADS ECU is a condition just prior to near limit braking on a high mu surface where a brake re-distribution is helpful to avoid a skid or locking of any of the wheels.

ADS typically is preset for a vehicle type (comfort, sporty) or alternatively is selectable by the driver. In step 230, the ADS ECU 54 overrides the current pre-selected setting, when required (based on the above determination of a limit braking event while turning on high mu). For example, if the ADS is set at a "soft" comfort setting, the ADS ECU 54 changes the setting to a more "firm" sport setting. The braking trigger event results in stiffening of the whole system, not just 1-2 wheels. If the driver has already pre-selected a "firm" sport setting, the system may not be required to do anything for override.

As a result of the shift to a firmer setting, there is reduced body motion leading to steady load transfer amongst the wheels which increases braking effectiveness. Referring to steps 240 and 250, the ADS ECU maintains the overridden setting for a critical braking period. This period is preferably between 0.75 and 3 seconds. Referring to step 260, the system will revert back to the original predetermined or driver-selected setting after the critical braking time period expires.

Alternatively, if the automobile is provided with a Traction Control System (TCS) 62, this system may take the place of the ABS ECU 61, and provide braking information to the ADS ECU 54.

The advantages of the ADS cooperating with the braking system includes: Flat cornering feel—minimal roll or pitch even during spirited driving and braking; Responsive, precise and secure steering feel; Elimination of unwanted underdamped body heave, roll and pitch motions; Improved tire adhesion, vehicle stability and road isolation.

Figure 7:
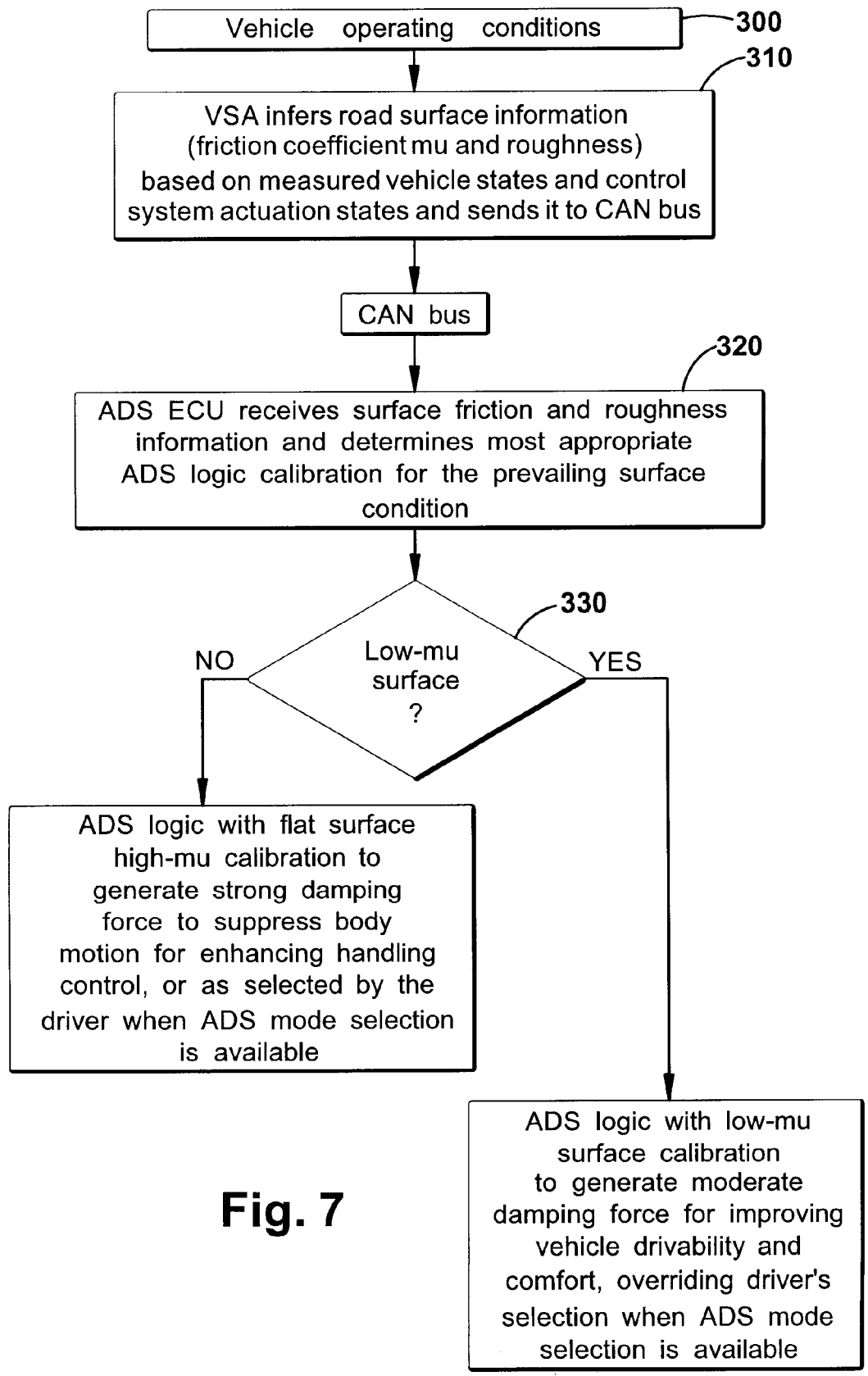
FIG. 7 is a flowchart showing steps within a third embodiment of the claimed invention.

ENHANCING ADS CONTROL USING OPERATIONAL MODE INFORMATION FROM VSA COMBINED WITH THE VEHICLE OPERATING STATE: Referring to FIGS. 1, 3, and 7, a third embodiment of the invention, including an improved method of controlling the overall maneuverability, ride comfort, and stability of a vehicle is provided. This improved method uses a technique to infer the road surface qualities including the road friction coefficient (mu) and road roughness index when combined with stability control intervention (TCS, AYC, ABS) operational status. The method then modifies the settings of the Active Damping System (ADS), if necessary, to stiffen the suspension damping control, thus preventing a significant shift of load in the vehicle, or to soften the suspension damping control for improving vehicle drivability and comfort. The adjustment of the ADS overrides any damping characteristics that were pre-selected by the driver or preset by the vehicle.

The operational (ON/OFF) status of an AYC, ABS, and/or Traction Control System (TCS) together with vehicle longitudinal and lateral accelerations are used to formulate a trigger for changing ADS calibration. As shown in FIG. 3, a range of vector G between 0.5 g and 1.0 g is shown and is considered the high mu operating area. The acceleration vector used to determine whether the vehicle is operating in this range is calculated by taking the square root of the sum of the squares of longitudinal and lateral acceleration.

In practice, road roughness estimates by the TCS/VSA/ABS are related to the perturbations in wheel speed sensor signals over a period of time. There are several "levels" of roughness, each corresponding to a given level of "noise" in the wheel speed signals. Roughness for each of the wheels is estimated based on this approach, then the roughness levels of each of the 4 wheels are compared to determine if the overall "roughness" of the road for the entire vehicle should be updated. When the roughness is "high" or "low", the control gains for ABS/TCS control are modified to take advantage of this information.

The coefficient of friction (mu) is a rating of the grip between a road surface and a tire. The value of the coefficient of friction is a fraction, which lies between zero and one. The lower the value of the coefficient of friction of the roadway, the more slippery the roadway will be. For example, an icy surface may have a coefficient of friction in the range of 0.1, while a clean, dry asphalt surface may have a coefficient of friction of approximately 0.9.

In step 310, and as illustrated by FIG. 3, if the AYC 60 or ABS 61 or TCS 62 is activated (AYC, ABS or TCS status is ON (activated); Operation bit=1) and, at the same time, the vehicle total acceleration (G) level (vector combination of vehicle longitudinal and lateral accelerations) is low (below 0.3 for example), an operation condition at the limit of low coefficient of friction is identified. If either AYC 60, ABS 61, or TCS 62 (AYC, ABS, or TCS status is ON) is activated at the same time the vehicle total acceleration level is high, an operation condition at the limit of high coefficient of friction is identified.

In the prior art, the ADS setting is usually fixed and thus is usually a trade-off of ride comfort, maneuverability and stability under different operating conditions or is selected by the driver through an external button located near the driver's seat, and thus is not directly and automatically linked to operating surface conditions.

Existing braking, AYC, and ADS systems usually work independently of each other with only minimum information sharing. The present embodiment of the invention uses road surface state information to adjust ADS damping characteristics to either, depending on the sensed road condition, minimize vehicle body motion and wheel load variation or improve drivability.

Referring to FIG. 7, in step 320, the inferred conditions of mu are sent to the ADS ECU 54 through the vehicle's CAN

64. After receiving the information, the ADS ECU 54 determines appropriate ADS settings based on the road conditions.

In step 330, the logic of determining the appropriate ADS setting is shown. If the road has a high coefficient of friction (mu), a strong damping force is instilled in the ADS to suppress body motion so as to enhance handling control. If the road has low coefficient of friction, a moderate or weak damping force is instilled in the ADS and as a result improves vehicle drivability and comfort.

ADS typically is preset for vehicle type (comfort or sporty) or alternatively is selectable by the driver. Within step 330, the ADS ECU overrides the current pre-selected setting, when required. For example, if a high coefficient of friction operation is identified and the ADS is set at a "soft" Comfort setting, the ADS ECU changes the setting to a more "firm" setting. If the driver has already pre-selected a "firm" setting, the system may not be required to do anything for override. Likewise, if a low coefficient of friction operation is identified and the ADS is set at a "firm" setting, the ADS ECU changes the setting to a more "soft" setting. If the driver has already pre-selected a "soft" setting, the system may not be required to do anything for override.

After the indicators (AYC and ABS and TCS activation status is OFF (not activated) Operation bit=0) for the prevailing operating surface are no longer true for some predetermined time, approximately 1-3 seconds, the ADS system automatically shifts back to the prior selected setting.

In one variation of this embodiment of the invention, any one of the system (AYC, TCS, ABS) status indicators being activated triggers use of the damping control, however in other variations, two or three of the systems must be considered activated.

The present invention uses existing vehicle control systems to infer road surface data without directly calculating the surface mu. Previously, the surface information was usually obtained by a separate estimator and was updated only when wheels began to slip. Since the ABS, AYC or TCS activation occurs shortly after wheel slip, there is no advantage to using the estimated surface mu as a trigger to change damping force control The condition that any of the feedback systems (AYC, ABS, TCS) has entered control, combined with the total vehicle G at that instant is sufficient to infer the road surface characteristics.

Figure 8:
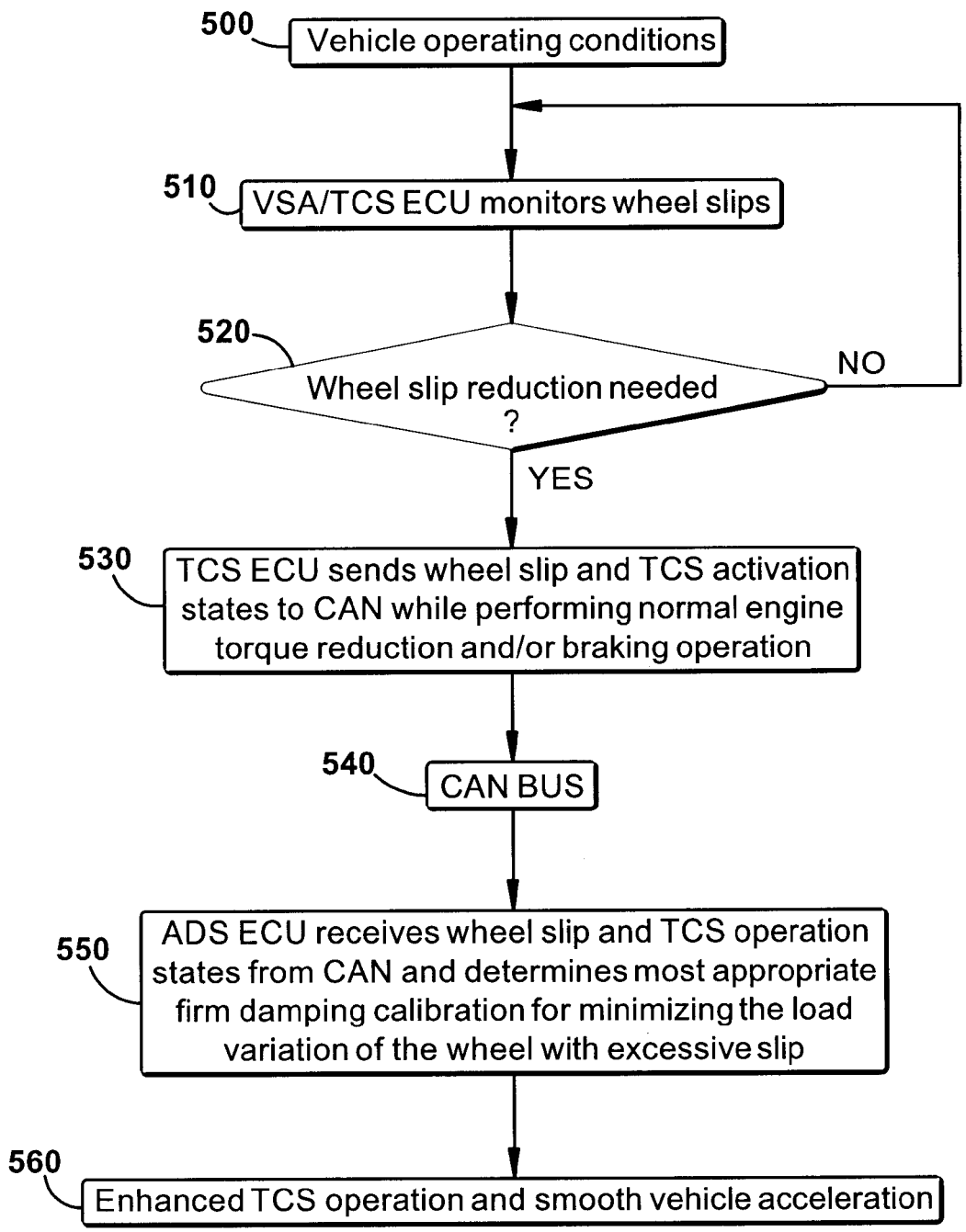
FIG. 8 is a flowchart showing steps within a fourth embodiment of the claimed invention.

TCS ENHANCEMENT UTILIZING ADS: A fourth embodiment of the invention is shown in FIGS. 1 and 8, wherein the TCS 62 and ADS 54 work in combination with each other. TCS 62 is usually designed to regulate wheel slip around some preset optimal region to maximize wheel traction. During vehicle operation, TCS 62 constantly monitors the slip ratio of each wheel of the vehicle. Whenever excessive wheel slip occurs, TCS 62 brings down the wheel slip to the optimal region through either throttle intervention, braking application or a combination of the two.

Since TCS 62 regulates wheel slip on a feedback basis without any prior knowledge about the factors that affect the wheel slip, especially the wheel load, whose fluctuation causes considerable wheel slip variation and, thus, may compromise TCS control efficiency and smoothness, especially during TCS braking operation, it is desirable that the wheel load variation be kept as small as possible during TCS 62 operation. The Active Damping System (ADS) 54 on the same vehicle now provides the opportunity to control wheel load variation by adjusting the damping force to minimize the load transfer among the wheels of the vehicle. This embodiment of the invention provides a control concept that uses ADS devices to adjust suspension damping force distribution during TCS 62 operation for the purpose of enhancing TCS 62 effectiveness and vehicle acceleration smoothness.

Referring to FIG. 8, in step 510 the TCS ECU 64 monitors vehicle operating conditions obtained from the vehicle sensors in step 500. The sensed information includes, but is not limited to vehicle speed 50 as well as individual wheel speeds 34. In step 520, if excessive wheel slip is determined, appropriate corrective measures are taken by the TCS 62 and ADS 54. The TCS 62, in step 530 takes known corrective action, namely reducing the torque supplied by the engine and/or application of the brakes 32 to the slipping wheel(s). In addition, the TCS 62 sends the wheel slip data and an indication that the TCS 62 is operative to the ADS ECU 54 via the vehicle CAN 64.

In step 550, the ADS ECU 54 determines the most appropriate calibration of individual controllable suspension components in order to minimize the load variations in the wheel which is experiencing excessive slippage. For example, if slip is determined to be excessive in the right rear wheel 26 of the vehicle, the stiffness of the suspension 38 in an area adjacent to the right rear wheel 26 is increased.

This embodiment of the invention adjusts ADS 54 damping calibration to minimize wheel load variation, thus facilitating TCS 62 braking operation and improving vehicle acceleration smoothness and quality feel.

COOPERATIVE STABILITY CONTROL USING ADS FRONT TO REAR SHIFTING: This fifth embodiment of the invention is concerned about minimizing VSA differential braking intervention for yaw moment control through an active suspension control system such as ADS 54 to improve VSA control smoothness and driver perception. According to this embodiment, the ADS ECU 54 constantly monitors the AYC ECU 60 operation states such as AYC ECU activation flags, vehicle stability factor and oversteer (OS)/understeer (US) indicators, which can be estimated based on the vehicle yaw rate error, AYC activation modes, target pressures, etc. When the AYC ECU 60 becomes activated, ADS ECU 54 determines that the AYC has judged that the vehicle requires corrective yaw moment to compensate either oversteer or understeer, and adjusts the front/rear damping force distribution to generate the corrective yaw moment demanded by AYC ECU 60 so as to minimize VSA-braking activation.

Figure 9:
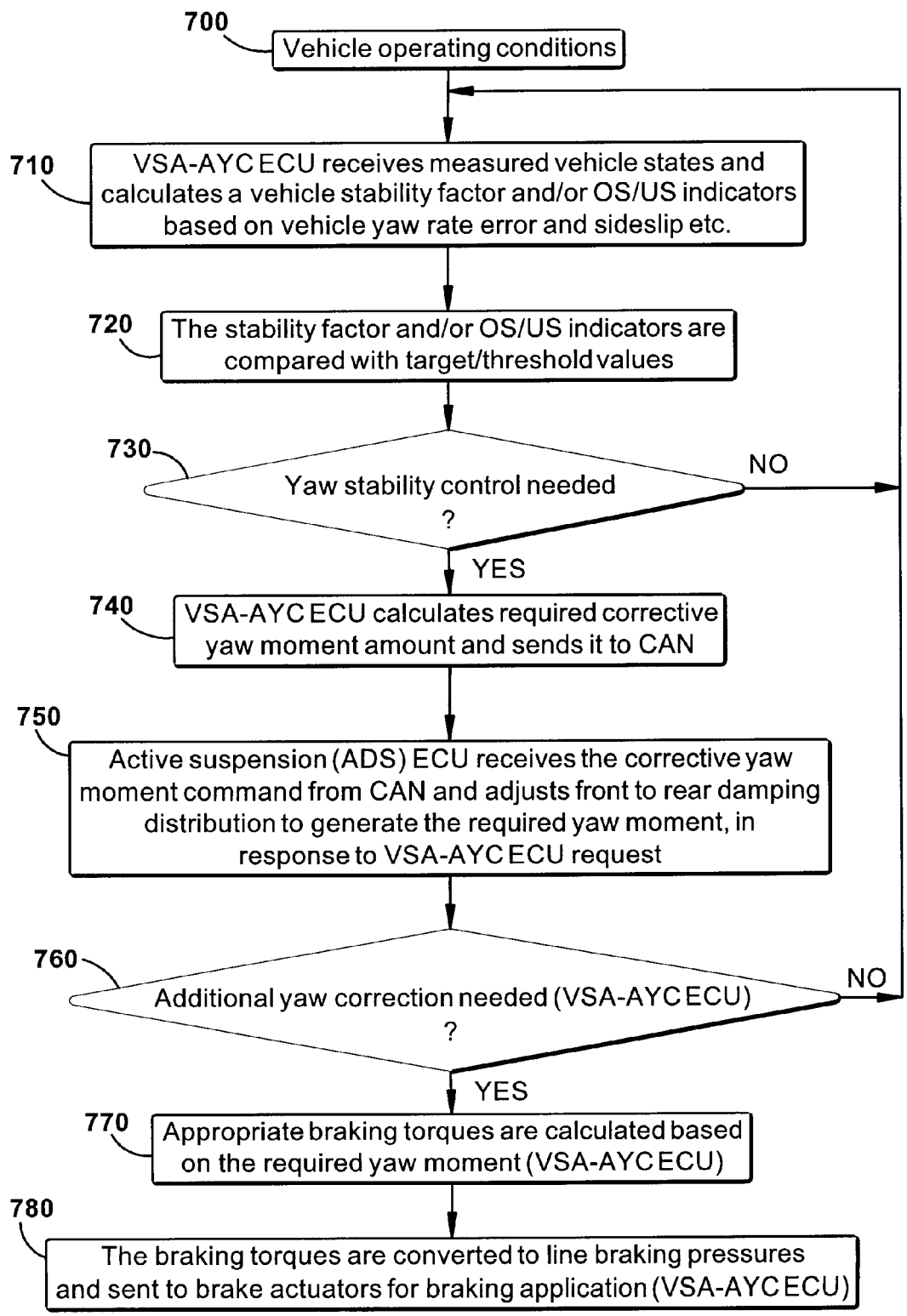
FIG. 9 is a flowchart showing steps within a fifth embodiment of the claimed invention.

Referring to FIGS. 1 and 9, in step 710 the AYC ECU 60 monitors vehicle operating conditions via sensed parameters read by the vehicle sensors. When the AYC ECU 60 determines that there is an undesired understeer or oversteer condition as determined by measured undesired sideslip or yaw rate (as determined by comparing to threshold values in step 720), the AYC ECU 60 takes corrective action in step 730.

As a corrective action, in step 740, the AYC ECU 60 calculates the required corrective yaw moment and sends it to the ADS ECU 54 via the CAN 64. The ADS ECU 54 adjusts distribution, in step 750, between the ADS system components in the front and rear of the vehicle's suspension. The shift of suspension stiffness, from front to rear or vice versa creates a counter-acting yaw moment. At each of the 4 wheels, the ADS knows the damping force (as an internal variable in its control loop). Depending on the stroke rate of the damper (rate of change of the vertical wheel travel), the ADS can determine if a stiffening or softening of the damping force will either contribute or subtract from the desired yaw moment change issued by the VSA. As the damping force stiffens or softens, there will be a change in the vertical wheel load. When the wheel load increases, so does the lateral tire force (generally speaking). So for an oversteer event, the ADS would re-adjust the front dampers such that the lateral forces are reduced (depending on the wheel stroke, this could be either an increase or decrease on either damper). At the rear, the ADS would adjust each damper to attempt to raise the tire forces (depending on the prevailing wheel stroke at the instant, this could be an increase or decrease in damping force of a given wheel). In a simplified case, the front dampers would likely be softened and the rear dampers stiffened to mitigate oversteer.

In step 760, the AYC ECU 60 determines if additional yaw corrective action is required beyond what was provided by the shifting of stiffness within the controllable suspension. If additional correction is required, appropriate braking torques are determined by the AYC ECU 60 in step 770 and the appropriate brakes 34 actuated in step 780.

This embodiment, by making use of existing vehicle stability state information from the AYC ECU 60 and adjusting the ADS ECU 54 control according to AYC corrective yaw moment requests to reduce yaw rate error and stabilize the vehicle, minimizes VSA-AYC braking activation and greatly improves vehicle control smoothness and quality feel, especially for the vehicle during transient steering operations.

Figure 10A:
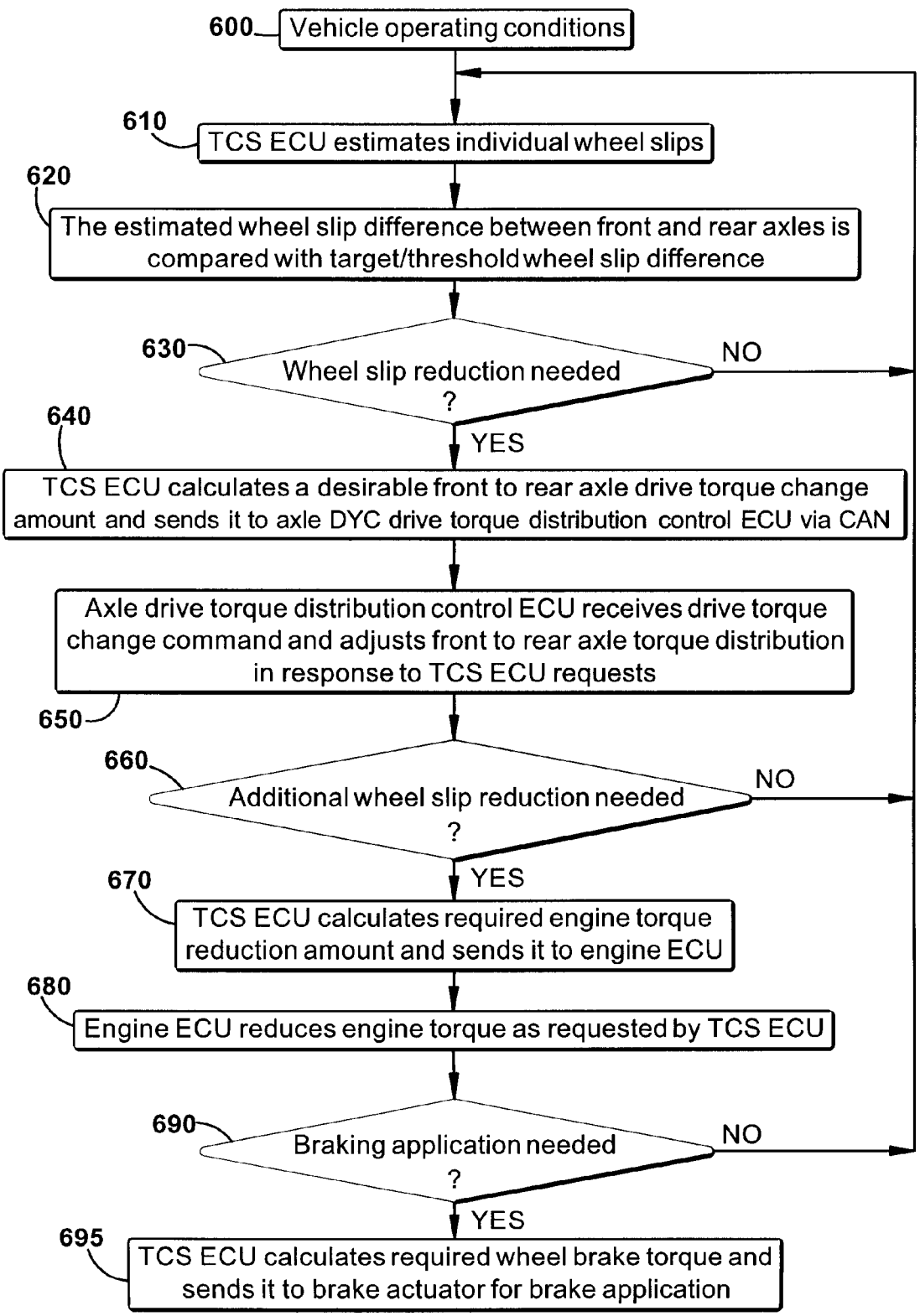
FIG. 10A is a flowchart showing steps within a sixth embodiment of the claimed invention.

WHEEL SLIP CONTROL UTILIZING A TCS SYSTEM WITH A FRONT/REAR AXLE DRIVE TORQUE DISTRIBUTION SYSTEM: A sixth embodiment of the invention is shown in FIGS. 1 and 10A, wherein the TCS 62 works to distribute torque between the front and rear axles, as necessary. TCS 62 is usually designed to regulate individual wheel or total axle slip below some preset threshold limit to enhance traction utilization. During vehicle operation, TCS 62 constantly monitors the slip ratio of each wheel. Whenever excessive wheel slip or wheel spinning occurs, TCS 62 brings down the wheel slip to the allowable region through either throttle intervention to reduce engine torque, braking or a combination of the two. TCS braking and throttle intervention are both considered to be intrusive to the driver, as they result in noise and vibration as well as hesitation to the vehicle momentum. This is because the amount of engine torque reduction required to reduce the wheel slips on the more critical axle also reduces the amount of traction utilization on the other axle that may have additional traction capability, as in the cases of vehicle launch acceleration on a snow or ice surface, on off-roads, or climbing slippery hills, as the wheel load on any axle of the vehicle is typically not proportional to the drive torque delivered to that axle.

In addition, in the case of a vehicle that is also equipped with a DYC drive torque distribution control system 58, such as 4WD, there is a possibility that while the TCS 62 is applying braking on a single wheel of an axle, the DYC drive torque control system 58 may be still delivering some drive torque to the same wheel, causing conflicting torque control and power wastage.

To overcome these drawbacks, wheel slips of each axle are controlled independently through the utilization of an available DYC drive torque control system 58 capable of Front to Rear drive torque distribution so as to minimize the TCS throttle and brake activity. The DYC drive torque control system 58, such as 4WD, provides the opportunity to independently control the wheel slips of each axle by drive torque redistribution between front and rear axles. Here, the TCS ECU 62 issues demands for front/rear torque distribution changes to the DYC Torque Distribution ECU 58 to adjust vehicle Front/Rear drive torque distribution in response to wheel slip conditions of each axle, as detected by TCS 62, for the purpose of minimizing TCS throttle and brake activity and enhancing vehicle drivability and smoothness, especially during low-mu launch acceleration and off-road starting operations.

Figure 10B:
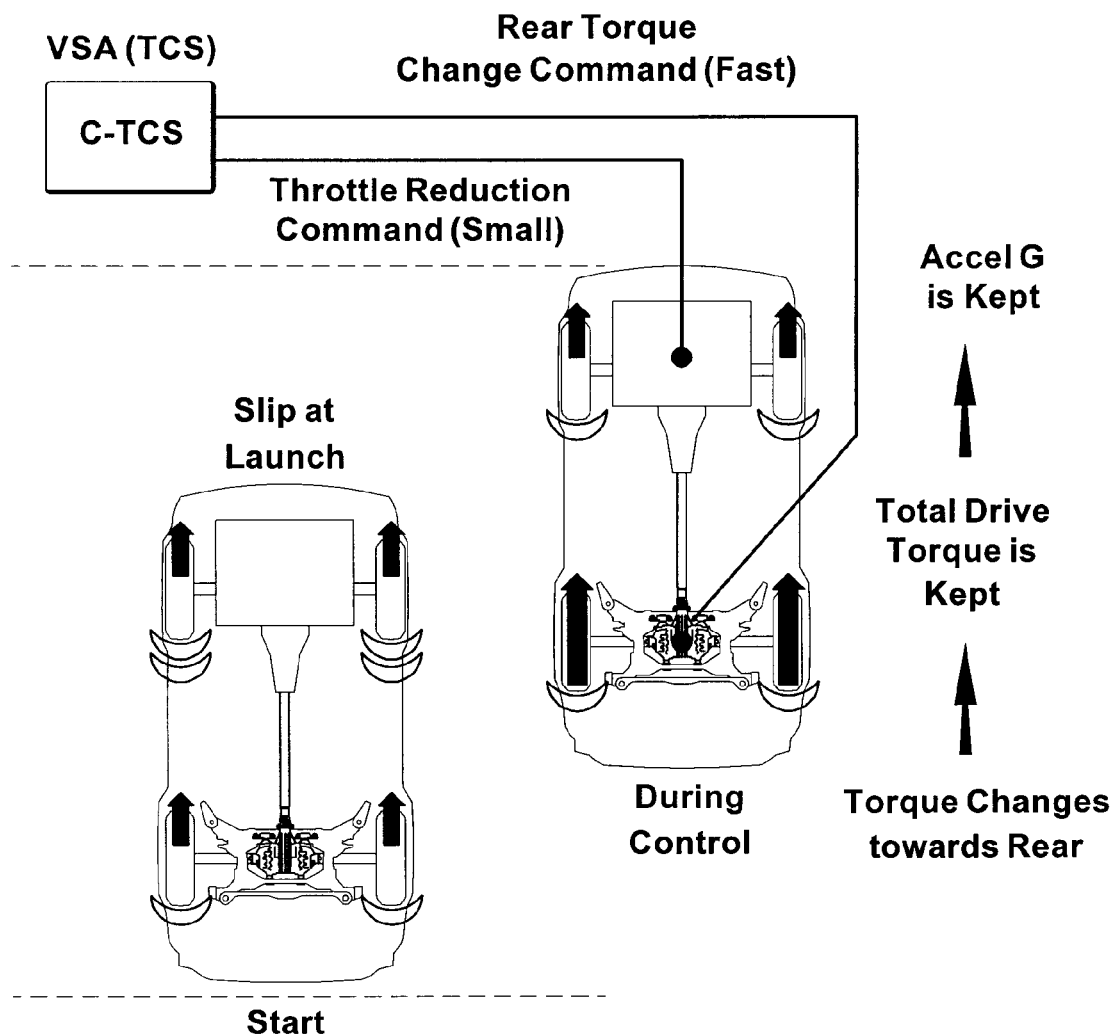
FIG. 10B is a schematic showing shifting of torque within a cooperative TCS.

Referring to FIGS. 10A and 10B, and considering a driving situation where the front wheels slip before the rear wheels due to road condition variations, in step 610 the TCS ECU 62 monitors vehicle operating conditions obtained from the vehicle sensors in step 600. TCS estimates individual wheel slips in step 610 according to a variety of techniques known in typical TCS control systems. In step 620, the amount of wheel slip occurring in wheels on the front axle is compared to a control entry threshold to determine if intervention is required to mitigate wheel spin. The control entry threshold is a wheel slip of less than 15% or so, preferably less than 5%~8% at higher speeds.

In step 630 a determination is made as to whether wheel slip reduction is required. If wheel slip reduction is required, the appropriate distribution of torque between the wheels on the front axle and the wheels on the rear axle is determined by the TCS ECU 62 in step 640. Commands to implement the desired distribution of torque are sent from the TCS ECU 62 to the DYC torque distribution ECU 58. In step 650 the DYC drive torque distribution ECU 58 shifts torque between wheels on the front axle and wheels on the rear axle. FIG. 10B shows, schematically, a shift of torque from wheels on the front axle to wheels on the rear axle, with the total drive torque kept nearly constant (throttle reduction small).

Referring back to FIG. 10A, in step 660 the TCS ECU 62, in the case where the output torque of the engine and transmission is judged to be too large to sustain traction on all 4 wheels simultaneously, determines if additional torque reduction is required. If additional torque reduction is required, the TCS ECU 62, in steps 670-695 takes known corrective action, namely reducing the torque supplied by the engine and/or application of the brakes (in either order).

The process of steps 600-695 also applies to a driving situation where the rear wheels slip first due to road conditions and the cooperative relation between TCS and DYC Torque Distribution System acts to shift torque from the rear axle to the front axle to mitigate rear axle slippage.

Figure 10C:
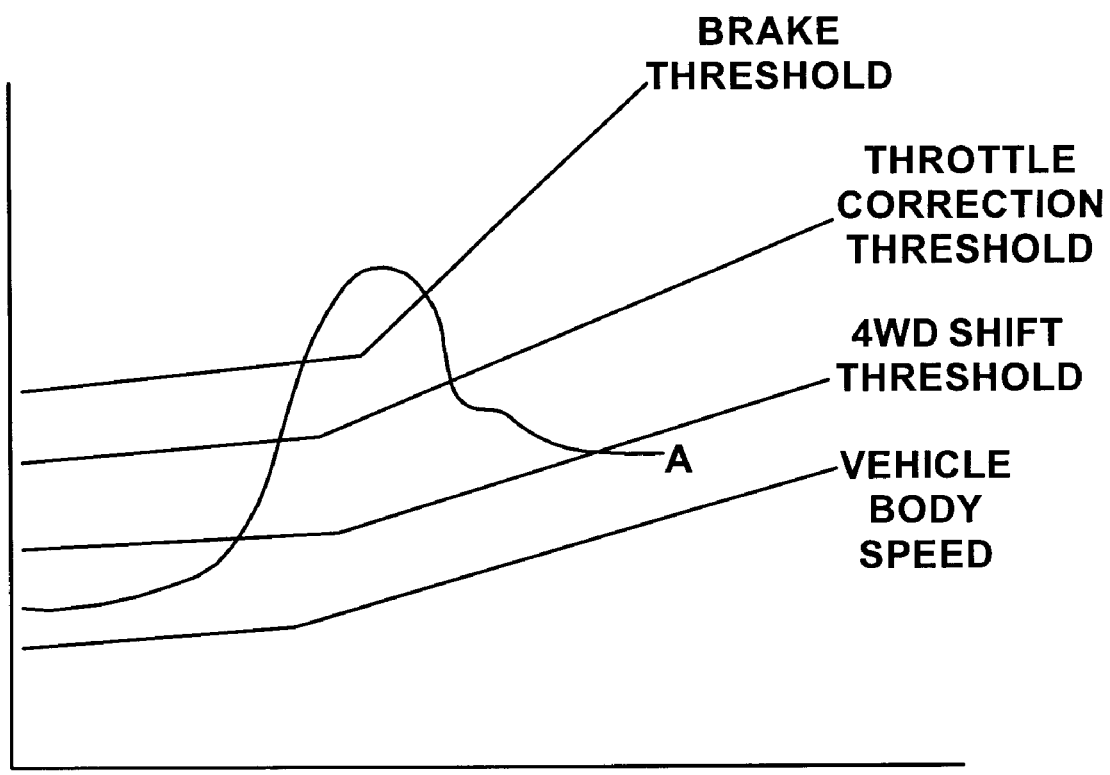
FIG. 10C is a graph showing different thresholds for triggering different solutions for controlling the vehicle.

FIG. 10C schematically shows the implementation of the three stages of correction of slip through the TCS system 62. When the line "A" that indicates the speed of the most dominant vehicle wheel exceeds the body speed of the vehicle, slipping is occurring. The first correction threshold that is crossed (vertically in the figure) is the distribution of drive torque between the front and rear wheels as described above. If this threshold is exceeded, the TCS requests the DYC Torque Distribution system to shift torque away from the axle of the slipping wheel according to the previous discussion. If the slip rate continues to increase to where it surpasses the throttle correction threshold, then throttle variation control is implemented. Furthermore, if the slip continues to grow and it surpasses the brake correction threshold, then brake application is performed. The three thresholds can be separated or combined depending on vehicle operating conditions to ensure both smooth control as well as sufficient control authority to manage a variety of slippery road conditions.

The method of the present embodiment significantly improves vehicle performance during take-off from snow or icy surfaces, on unpaved roads, or during the climbing of slippery hills. During these conditions, there is a high possibility of traction loss associated with non-ideal front to rear axle load distribution as well as local perturbations in the road coefficient that can lead to single wheel slippage, which can lead to a loss of vehicle maneuverability. With this embodiment, wheel spin is reduced, wheel control is smooth, and acceleration is improved.

Figure 12:
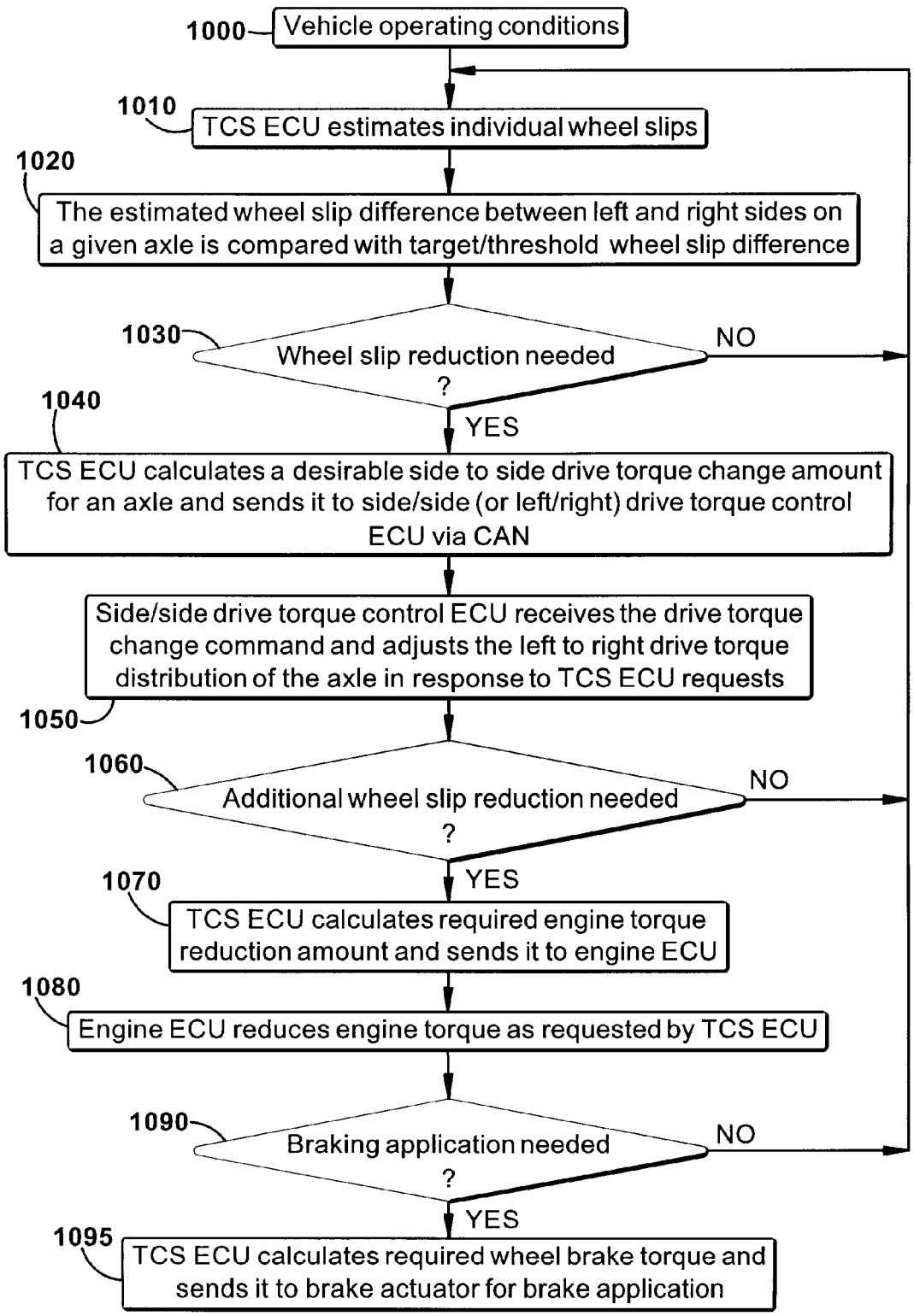
FIG. 12 is a flowchart showing steps within a seventh embodiment of the claimed invention.

A seventh embodiment of the invention is shown in FIG. 12, wherein the TCS ECU 62 works to distribute torque between the left and right side wheels on a given axle, as necessary. This action helps to reduce differential braking control on a given axle (brake control used to keep the left and right side wheels within a specified speed difference) and leads to refinements in control smoothness. Since throttle control itself can not easily mitigate side-to-side differences in wheel speed (such as when one side of the vehicle is on a low mu surface and the other on a high mu surface), a side-to-side torque re-distribution to slow the faster of the two spinning wheels provides enhanced control.

In the present variation, due to the inclusion of a torque distribution system that can distribute torque between the four wheels (side to side and front to back), such as a 4WD system, the need to reduce engine torque or introduce braking can be lessened or eliminated. The present variation combines the basic functions of a feed-forward based drive torque control such as 4WD with the control of a wheel slip-based feed-back brake and throttle control system (TCS) 62 such that the TCS ECU 62 now has the capability to request drive torque reduction at each rear wheel of the vehicle to the drive torque control ECU 58.

The primary operational function of the proposed concept is to redistribute the available drive torque between Rear Left and Right wheels by use of an available drive torque actuator, such as a 4WD system, in response to rear left and right wheel slip conditions of the vehicle.

Referring to FIGS. 1 and 12, in step 1000 the TCS ECU 62 monitors vehicle operating conditions obtained from the vehicle sensors. In step 1010 the amount of individual wheel slip is calculated and in step 1020 the amount of wheel slip occurring in wheels on the left and right sides on the front axle is compared. The difference in slippage between the left and right sides is compared to a target/threshold difference.

In step 1030 a determination is made as to whether wheel slip reduction is required. If wheel slip reduction is required, the appropriate distribution of torque between the left and right wheels on the given axle is determined by the TCS ECU 62 in step 1040. Commands to implement the desired distribution of torque are sent from the TCS ECU 62 to the DYC torque distribution ECU 58. In step 1050 the DYC drive torque distribution system 58 shifts torque between the left and right wheels on the given axle. Steps 1000-1050 can be applied to either the front or rear axle of a vehicle (or both simultaneously) depending of what type of system 4WD, FWD, RWD is provided on the vehicle. This lateral control can also be combined with the longitudinal control explained in the previous embodiment of the invention.

In step 1060, the TCS ECU 62 determines if additional torque reduction is required. If additional torque reduction is required, the TCS ECU 62, in steps 1070-1095 takes known corrective action, namely applying differential brake control (as described above), or in extreme cases reducing the torque supplied by the engine and/or application of the brakes.

The present embodiment is primarily concerned about overcoming the drawbacks associated with existing TCS systems, and to enhance vehicle acceleration control smoothness. The main operational enhancement of this embodiment relates to, but is not limited to, vehicle launch or acceleration on road surfaces where individual tires do not have the same traction limit due to local variations in road surface coefficient, split friction coefficient (mu) surfaces or during cornering. During vehicle launch or acceleration on split friction coefficient (mu) surfaces or during cornering, there is a high possibility of traction loss on one side of either the front or the rear axle, associated with asymmetrical rear left and right tractions, which may lead to loss of vehicle drivability and/or stability.

Referring to FIGS. 1, 3, 13 and 14, an eighth embodiment of the invention including an improved method of controlling the stability of a vehicle is provided. This improved method uses recognition of road surface qualities including the road friction coefficient (mu) as determined by a Vehicle Stability Assist system (VSA). The method then modifies the settings of a drive torque control device(s), if necessary, to redistribute drive torque between 2 or 4 wheels, thus providing improved vehicle drivability and stability or improved handling, depending upon the road conditions. The adjustment of the drive torque distribution overrides any torque distribution characteristics that were pre-selected by the driver. In addition to, or as an alternative to the AYC ECU 60 estimating road surface information, the operational (ON/OFF) status of a AYC 60, and/or TCS 62 may be used as a trigger for changing drive torque distribution calibration in combination with a vector representation of vehicle acceleration (G).

Existing drive torque, and VSA systems usually work independently of each other with only minimum information sharing. The present invention uses calculated or inferred road surface state information to adjust drive torque characteristics to either, depending on the sensed road condition, provide moderate front to rear and side to side torque biases to improve vehicle drivability and stability, or provide strong front to rear and side to side torque biases to improve vehicle handling driving pleasure.

DYC Torque Distribution Systems are capable of side to side torque distributions of anywhere between moderate 50% right side and 50% left side (equal distribution), to strong 100% right side and 0% left side (or vise-versa) representing all the axle torque to be on one wheel. DYC Torque Distribution Systems are capable of front-to rear distribution ranging from moderate 50% front and 50% rear (equal distribution), and strong 100% front and 0% rear, representing all torque on a given axle.

Figure 13:
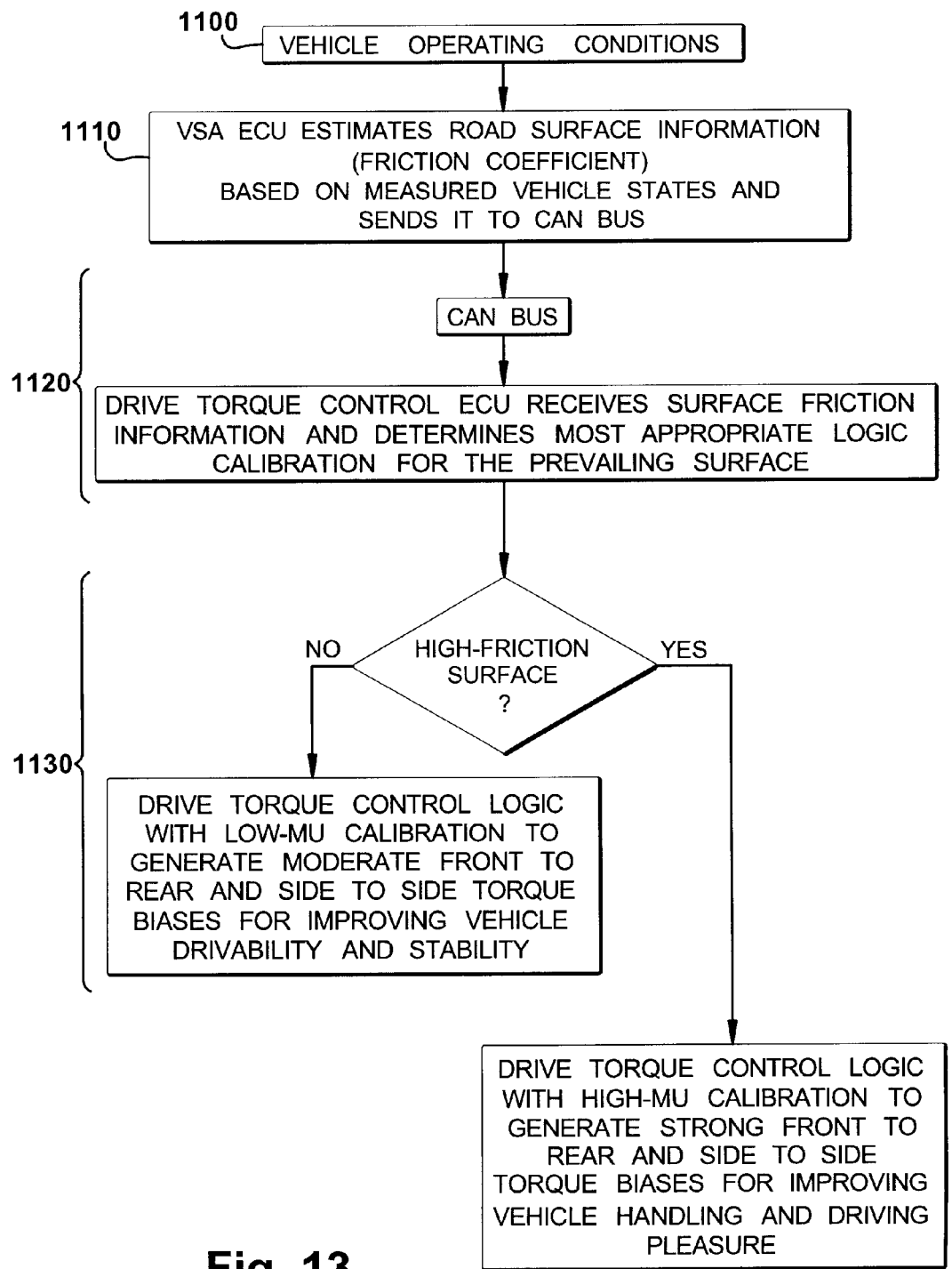
FIG. 13 is a flowchart showing steps within an eighth embodiment of the claimed invention.

With reference to FIG. 13, an improved method of vehicle stability control is described. In step 1100, readings of vehicle operating conditions are made, including wheel speed, longitudinal acceleration, lateral acceleration, yaw rate, engine operational parameters, and transmission operational parameters. In step 1110, the AYC ECU 60 and/or TCS ECU 62 uses these measured operating conditions to estimate road surface conditions, namely, the road coefficient of friction (mu). Direct measurement of mu by known methods may be performed or inference of mu may be done by the method previously described.

In step 1120, the measured condition of mu is sent to the DYC Drive Torque Control ECU 58 through the vehicle's CAN 64. After receiving the information, the Drive Torque Control ECU 58 determines appropriate distribution of drive torque based on the road conditions.

In step 1130, the logic of determining the appropriate distribution of drive torque is shown. If the road has a high coefficient of friction (mu), depending on the capability of the systems on the vehicle, a strong front to rear and side to side torque biases are set to improve vehicle handling and driving pleasure. If the vehicle has all wheel drive, strong front to rear torque bias is set and strong side to side torque bias is set. If the vehicle has only a FWD system, strong side to side torque bias is set only on the front wheels. If the vehicle has only a RWD system, strong side to side torque bias is set only on the rear wheels.

If the road has a low coefficient of friction (mu), depending on the capability of the systems on the vehicle, moderate front to rear and side to side torque biases are set to improve vehicle drivability and stability. If the vehicle has all wheel drive, moderate front to rear torque bias is set and moderate side to side torque bias is set. If the vehicle has only a FWD system, moderate side to side torque bias is set only on the front wheels. If the vehicle has only a RWD system, moderate side to side torque bias is set only on the rear wheels.

Drive Torque distribution typically is preset for vehicle type (comfort, sporty) or alternatively is selectable by the driver. As lateral acceleration increases during cornering, drive torque is sent more strongly to the rear axle and to the outside rear wheel. Nearly 70% of the total driveline torque can exist at the outside, rear wheel at the limiting case. For a sporty setting the progression from a nearly even distribution (25% at each wheel) to this 70% outside-rear condition occurs at a lower lateral acceleration than a more comfort oriented setting. The torque transition gain is lower for a more comfort setting and higher for a sporty setting. Within step 1130, the DYC Drive Torque Control ECU overrides the current pre-selected setting, when required. For example, if the distribution is set at a sporty setting with strong front to rear and side to side bias, the Drive Torque Control ECU changes the setting to a comfort setting with moderate front to rear and side to side bias. If the driver has already pre-selected a comfort setting, the system may not be required to do anything for override.

The redistribution of drive torque occurs typically when the vehicle is starting up from a stand still position. The redistribution is maintained for a set period of time and then reset back to the bias presetting selected by the driver. Alternatively, as opposed to a set period of time, if longitudinal acceleration reaches a threshold value, the system resets back to the bias presetting selected by the driver.

Figure 14:
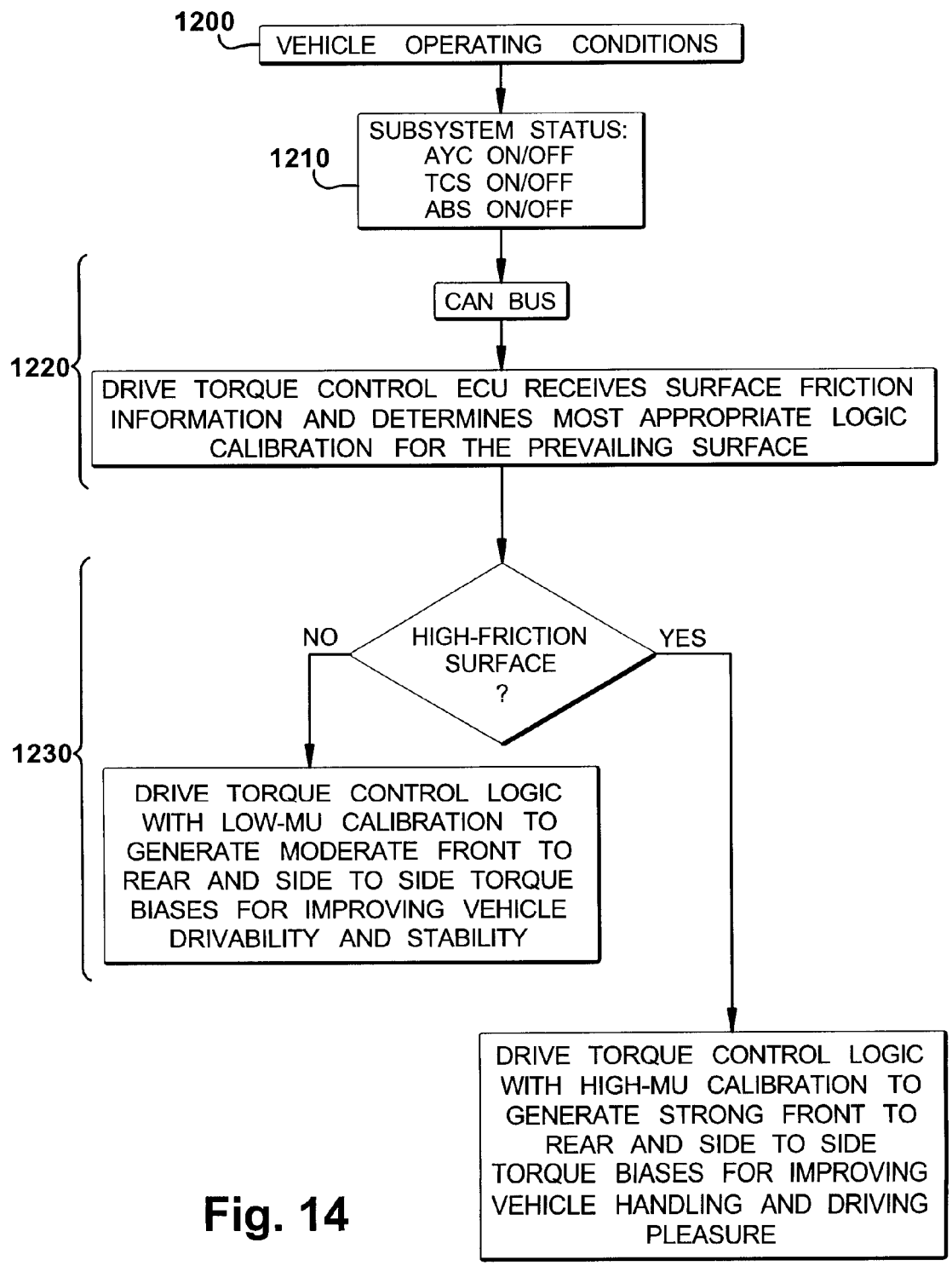
FIG. 14 is a flowchart showing steps within a variation of the eighth embodiment of the claimed invention.

Referring to FIG. 14, in an alternative variation of this embodiment of the invention, instead of using sensed/measured road conditions, in step 1210, the operational status of a vehicle equipped with a AYC system, TCS system and ABS system is used in combination with a vector representation of the vehicle's acceleration G (as previous described) is used to infer road conditions. The operational status of the AYC, TCS and ABS systems is determined; Simply is the system operating or not operating? If one of the systems is operating, it is an indication that the road surface either has a low or high coefficient of friction.

After making a determination of road coefficient of friction and roughness in step 1220, the remaining steps of the method are unchanged.

Instead of relying solely on the VSA system to determine the road coefficient of friction, the system may also sense longitudinal acceleration, lateral acceleration, yaw rate, or sense rain contacting the windshield and adjust the VSA calculated coefficient of friction.

The present invention eliminates the trade-off of drive torque control system capabilities under different road conditions and thus maximizes the drive torque control system potential benefits. The system also reduces unwanted VSA activation for smooth vehicle handling and stability control.

Although the invention has been shown and described with reference to certain preferred and alternate embodiments, the invention is not limited to these specific embodiments. Minor variations and insubstantial differences in the various combinations of materials and methods of application may occur to those of ordinary skill in the art while remaining within the scope of the invention as claimed and equivalents.

What is claimed is:

1. A cooperative Active Damping System (ADS) method for providing enhanced stability of a vehicle travelling on a road, comprising the steps of:

providing an Active Damping System (ADS) for adjusting suspension characteristics on the vehicle;

providing an Antilock Braking System (ABS) on the vehicle;

providing a Traction Control System (TCS) on the vehicle;

providing an Active Yaw Control (AYC) system on the vehicle;

inferring a high coefficient of friction of the road surface when an operational (Activating/Not activating) status of at least one of the TCS and AYC systems is "Activating" and a vector representation of the vehicle's longitudinal and lateral acceleration is greater than 0.5 g, and inferring a low coefficient of friction of the road surface when the operational status of at least one of the TCS and AYC systems is "Activating" and the vector representation of acceleration is below 0.3 g; and upon inferring a high coefficient of road surface friction, adjusting a damping state of the ADS to a high damping setting; and upon inferring a low coefficient of road surface friction, adjusting the damping state of the ADS to a low damping setting.

2. The method of claim 1, wherein after a fixed period of time of between 1 and 3 seconds, returning the ADS to a damping state prior to inferring road conditions.

3. The method of claim 1, wherein the adjustments to the damping state of the ADS override a driver pre-selected damping state of the ADS.

4. The method of claim 1, wherein the ADS includes electronically controlled, fast-acting Magneto-Rheological fluid dampers.

5. A method for providing enhanced vehicle stability comprising the steps of:

providing a vehicle with all wheel drive;

providing a Vehicle Stability Assist (VSA) system on the vehicle;

providing a Traction Control system (TCS) on the vehicle;

providing an Active Yaw Control (AYC) system on the vehicle;

inferring a high coefficient of friction of a road surface when an operational (Activating/Not activating) status of at least one of the TCS and AYC systems is On and a vector representation of the vehicle's longitudinal and lateral acceleration is greater than 0.5 g and inferring a low coefficient of friction of the road surface when the operational status of each of the TCS and AYC systems is "Activating" and the vector representation of acceleration is below 0.3 g; and upon inferring the coefficient of friction of the road, changing thea distribution of torque amongst vehicle wheels as follows:

if the coefficient of friction is high, implementing a strong side to side and front to rear torque bias; and if the coefficient of friction is low, implementing a moderate side to side and front to rear torque bias.

6. The method of claim 5, wherein after a fixed period of time between 1 and 3 seconds, returning the distribution of drive torque to a state prior to inferring road conditions.

7. The method of claim 5, wherein changes to the distribution of drive torque overrides any driver pre-selected distribution of drive torque.

* * * * *